(12) United States Patent  
Kimura

(10) Patent No.: US 12,155,331 B2  
(45) Date of Patent: Nov. 26, 2024

(54) MOTOR CONTROLLER, MOTOR SYSTEM AND METHOD FOR CONTROLLING MOTOR

(71) Applicant: MINEBEA MITSUMI Inc., Nagano (JP)

(72) Inventor: Toshiki Kimura, Nagano (JP)

(73) Assignee: MINEBEA MITSUMI Inc., Nagano (JP)

( * ) Notice: Subject to any disclaimer, the term of this patent is extended or adjusted under 35 U.S.C. 154(b) by 260 days.

(21) Appl. No.: 17/907,299

(22) PCT Filed: Mar. 18, 2021

(86) PCT No.: PCT/JP2021/011194  
§ 371 (c)(1),  
(2) Date: Sep. 26, 2022

(87) PCT Pub. No.: WO2021/200236  
PCT Pub. Date: Oct. 7, 2021

(65) Prior Publication Data  
US 2023/0111291 A1 Apr. 13, 2023

(30) Foreign Application Priority Data  
Mar. 31, 2020 (JP) .................................. 2020-064148

(51) Int. Cl.  
*H02P 1/30* (2006.01)  
*H02P 1/52* (2006.01)  
(Continued)

(52) U.S. Cl.  
CPC .............. *H02P 27/08* (2013.01); *H02P 23/14* (2013.01)

(58) Field of Classification Search  
CPC ................................ H02P 27/08; H02P 23/14  
(Continued)

(56) References Cited

U.S. PATENT DOCUMENTS 10,868,742 B2 * 12/2020 Chitalia .............. G06F 11/3452  
2011/0050740 A1 * 3/2011 Lee ...................... G09G 3/3233  
345/690

(Continued)

FOREIGN PATENT DOCUMENTS

JP 2007-166695 6/2007  
JP 2009-077503 4/2009  
(Continued)

OTHER PUBLICATIONS

International Search Report of Int. Appl. No. PCT/JP2021/011194 dated May 18, 2021.

*Primary Examiner* — Erick D Glass  
(74) *Attorney, Agent, or Firm* — IPUSA, PLLC

(57) ABSTRACT

A method for energizing a motor with a rotor by turning on a different portion of all arms, for each energization pattern, among the arms of an inverter, is provided. The method includes generating a PWM signal, for each phase, with a duty cycle of a same value, the PWM signal having a first period length that is defined by a first period during which a portion of the arms is turned on with a first energization pattern, during an idle time of the rotor; a second period during which a portion of the arms is turned on with a second energization pattern, during the idle time; and a third period during which all upper arms or all lower arms, among the arms, are turned on with a third energization pattern, during the idle time. The method includes subtracting, from a first current magnitude or a second current magnitude, a magnitude that is half of a sum of the first current magnitude for a first phase flowing through a current detection unit, which is coupled to a DC side of the inverter, during the first period, and the second current magnitude for the first phase flowing through the current detection unit during the second (Continued)

period, thereby calculating an offset current magnitude for the first phase during the idle time.

11 Claims, 18 Drawing Sheets

(51) Int. Cl.
  *H02P 3/00* (2006.01)
  *H02P 23/14* (2006.01)
  *H02P 27/08* (2006.01)
(58) Field of Classification Search
  USPC .......................................................... 318/503
  See application file for complete search history.

(56) References Cited

U.S. PATENT DOCUMENTS

| | | | |
|---|---|---|---|
| 2015/0303844 A1 | 10/2015 | Ajima et al. | |
| 2019/0068098 A1* | 2/2019 | Iijima | H02P 6/28 |

FOREIGN PATENT DOCUMENTS

| | | |
|---|---|---|
| JP | 2012-147599 | 8/2012 |
| JP | 2013-220007 | 10/2013 |
| JP | 2015-208071 | 11/2015 |

* cited by examiner

MOTOR CONTROLLER, MOTOR SYSTEM AND METHOD FOR CONTROLLING MOTOR

TECHNICAL FIELD

The present invention relates to a motor controller, a motor system, and a method for controlling a motor.

BACKGROUND

Conventionally, a current detection system that employs one shunt is known in which one shunt resistor connected to a DC bus of an inverter circuit is used to detect a phase current for each phase for controlling a motor (for example, Patent Document 1).

CITATION LIST

Patent Document

[Patent Document 1] Japanese Unexamined Patent Application Publication No. 2015-208071

SUMMARY

When the motor is controlled by the current detection system that employs one shunt, there are cases where the current flowing through a current detection unit, which is the one shunt, is detected before an inverter rotates a rotor (i.e., before the motor starts up). The current detected before the motor starts up is used, for example, for failure detection that is performed prior to start-up of the motor, or for increases in accuracy of current detection or failure detection that is performed when the motor starts with the inverter and thus the inverter rotates the rotor.

However, while the rotor is idling before the inverter rotates the rotor, in a case where the current flowing through the current detection unit, which is one shunt, is detected, there are cases where rotation of the rotor is inhibited by regenerative braking that is produced at an idling rotor. When the rotation of the idling rotor is inhibited, unintended behaviors such as deceleration or abnormal noise of the motor may occur.

In the present disclosure, a motor controller, a motor system, and a method for controlling a motor that is capable of detecting a current flowing into a current detection unit to allow for reductions in inhibition of idling of a rotor are provided.

A motor controller according to one embodiment of the present disclosure includes:
  an inverter configured to turn on a different portion of all arms, for each energization pattern, among the arms, to energize a motor that includes a rotor;
  a current detection unit coupled to a DC side of the inverter;
  a PWM signal generator configured to generate a PWM signal, for each phase, with a duty cycle of a same value, the PWM signal having a first period length that is defined by
    a first period during which a portion of the arms is turned on with a first energization pattern, during an idle time of the rotor,
    a second period during which a portion of the arms is turned on with a second energization pattern, during the idle time, and
    a third period during which all upper arms or all lower arms, among the arms, are turned on with a third energization pattern, during the idle time; and
  a current detector configured to
    subtract, from a first current magnitude or a second current magnitude, a magnitude that is half of a sum of the first current magnitude for a first phase flowing through the current detection unit during the first period, and the second current magnitude for the first phase flowing through the current detection unit during the second period, and
    calculate an offset current magnitude for the first phase during the idle time.

Effect of the Invention

According to the present disclosure, the current flowing into a current detection unit is detected to allow for reductions in inhibition of idling of a rotor.

DESCRIPTION OF EMBODIMENTS

A motor controller, a motor system, and a method for controlling a motor according to one or more embodiments of the present invention will be described below in detail with reference to the drawings.

Figure 1:
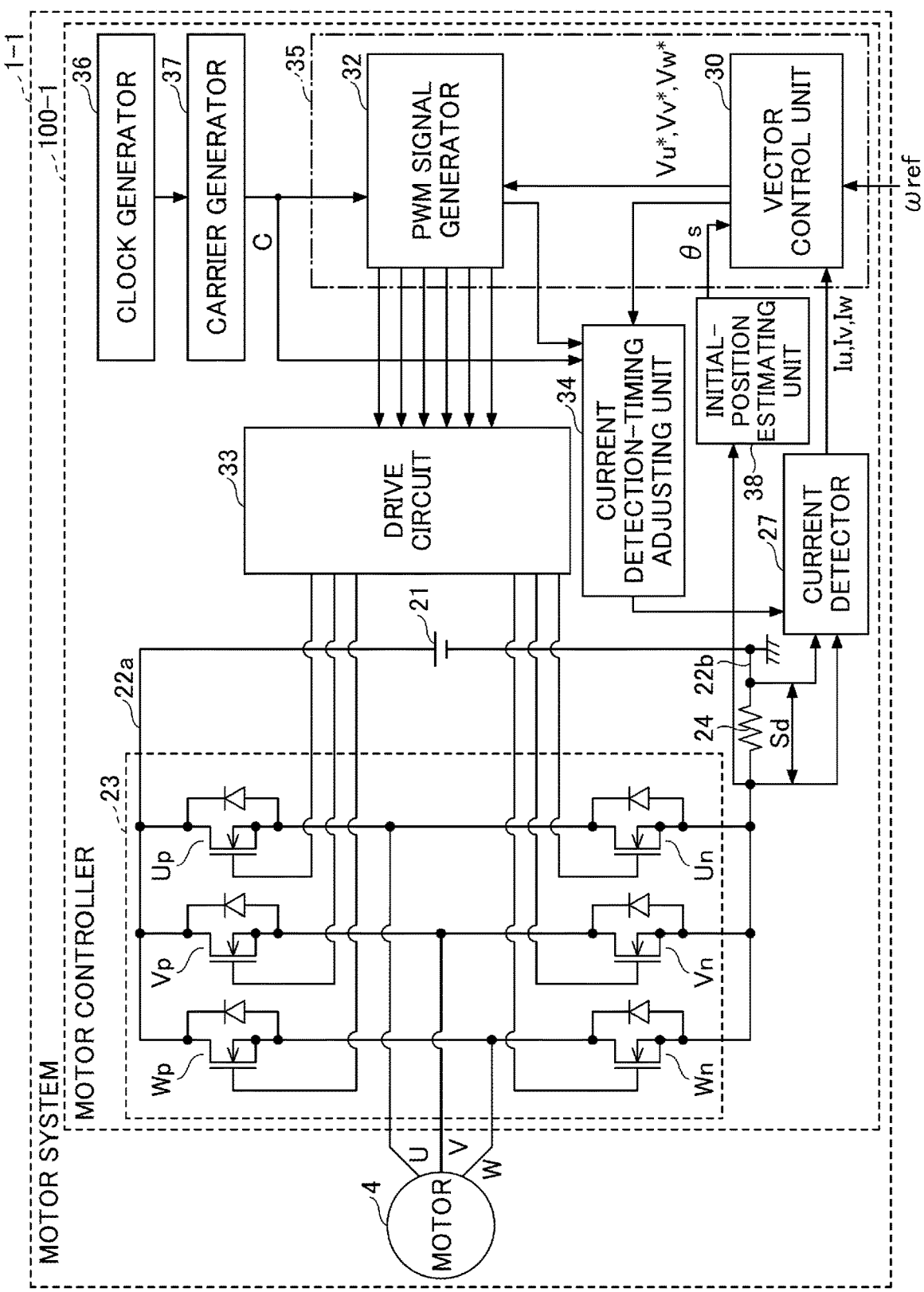
FIG. 1 is a diagram illustrating an example of the configuration of a motor system according to a first embodiment of the present invention.

FIG. 1 is a diagram illustrating an example of the configuration of a motor system 1-1 according to a first embodiment of the present invention. The motor system 1-1 illustrated in FIG. 1 controls a rotary motion of a motor 4. A device in which the motor system 1-1 is provided includes, for example, a copier, a personal computer, a refrigerator, or the like, but is not limited thereto. The motor system 1-1 includes at least the motor 4 and a motor controller 100-1.

The motor 4 is a permanent-magnet synchronous motor including multiple coils. For example, the motor 4 includes three-phase coils having a U-phase coil, a V-phase coil, and a W-phase coil. A specific example of the motor 4 includes a three-phase brushless DC motor or the like. The motor 4 includes a rotor at which at least one permanent magnet is arranged, and includes a stator disposed around an axis of the rotor. The motor 4 is a sensorless motor that does not use any position sensor to detect an angular position (pole position) of a magnet of a rotor. The motor 4 is, for example, a fan motor that rotates a fan for blowing air.

Based on an energization pattern that includes PWM signals for three phases, the motor controller 100-1 performs on-off control for the multiple switching elements, which are coupled to constitute a three-phase bridge, and thus drives the motor through an inverter that converts a direct current into a three-phase alternating current. The motor controller 100-1 includes an inverter 23, a current detector 27, a current detection-timing adjusting unit 34, a drive circuit 33, an energization pattern generator 35, a carrier generator 37, and a clock generator 36.

The inverter 23 is a circuit that converts the direct current delivered from a DC power source 21 into the three-phase alternating current, by switching of the switching elements, and then rotates a rotor of the motor 4 in response to a three-phase drive alternating current flowing into the motor 4. The inverter 23 drives the motor 4 based on multiple energization patterns (more specifically, PWM signals, for three phases, generated by the PWM signal generator 32 in the energization pattern generator 35) that the energization pattern generator 35 generates. PWM means pulse width modulation.

The inverter 23 includes multiple arms Up, Vp, Wp, Un, Vn, and Wn that are coupled to constitute a three-phase bridge. Upper arms Up, Up, and Wp are high-side switching elements that are coupled to a positive electrode of the DC power source 21, via a positive-side bus 22a. Lower arms Un, Vn, and Wn are low-side switching elements that are coupled to a negative electrode (specifically, a ground) of the DC power source 21. The multiple arms Up, Vp, Wp, Un, Vn, and Wn are each turned on or off in accordance with a corresponding drive signal, among multiple drive signals that the drive circuit 33 provides based on respective PWM signals included in the energization pattern. In the following description, the arms Up, Vp, Wp, Un, Vn, and Wn may be also simply referred to as arms, when they are not particularly distinguished from one another.

A connection point of the upper arm Up for the U-phase and the lower arm Un for the U phase is coupled to one end of the U-phase coil of the motor 4. A connection point of the upper arm Vp for the V phase and the lower arm Vn for the V phase is coupled to one end of the V-phase coil of the motor 4. A connection point of the upper arm Wp for the W phase and the lower arm Wn for the W phase is coupled to one end of the W-phase coil of the motor 4. The respective other ends of the U-phase coil, the V-phase coil, and the W-phase coil are coupled to one another.

A specific example of each arm includes an N-channel MOSFET (metal oxide semiconductor field effect transistor), an IGBT (insulated gate bipolar transistor), or the like. However, the arm is not limited to the examples described above.

The current detection unit 24 is coupled at a DC side of the inverter 23 and outputs a detection signal Sd corresponding to the magnitude of the current that flows into the DC side of the inverter 23. The current detection unit 24 illustrated in FIG. 1 generates the detection signal Sd corresponding to the magnitude of the current flowing into a negative-side bus 22b. The current detection unit 24 is, for example, a current detection element disposed in the negative-side bus 22b. More specifically, the current detection unit 24 is a shunt resistor inserted in the negative-side bus 22b. The current detection element such as a shunt resistor generates, as a detection signal Sd, a voltage signal corresponding to the magnitude of the current through the current detection element.

The current detector 27 obtains the detection signal Sd based on the multiple energization patterns (more specifically, PWM signals for three phases) that the energization pattern generator 35 generates, to thereby detect phase currents Iu, Iv, and Iw, for the phases U, V, and W, flowing through the motor 4, respectively. More specifically, by obtaining the detection signal Sd at an acquisition timing that is synchronized with the multiple energization patterns (more specifically, PWM signals for three phases), the current detector 27 detects the phase currents Iu, Iv, and Iw, for the U, V, and W phases, to flow into the motor 4. The acquisition timing of the detection signal Sd is set by the current detection-timing adjusting unit 34.

For example, in the current detector 27, an AD (analog-to-digital) converter receives the detection signal Sd indicating an analog voltage that occurs across the current detection unit 24, at the acquisition timing that is set by the current detection-timing adjusting unit 34. The AD converter is provided in the current detector 27. The current detector 27 performs AD conversion in which the received analog detection signal Sd is converted into a digital detection signal Sd. By digitally processing the digital detection signal Sd after AD conversion, the current detector 27 respectively detects the phase currents for the U, V, and W phases of the motor 4. Detected values indicating the phase currents Iu, Iv, and Iw of the phases, which are detected by the current detector 27, are provided to the energization pattern generator 35.

A clock generator 36 is a circuit that generates a clock at a predetermined frequency, by using a built-in oscillation circuit and that outputs the generated clock to the carrier generator 37. For example, the clock generator 36 operates immediately when the motor controller 100-1 is powered on.

The carrier generator 37 generates a carrier C based on the clock generated by the clock generator 36. The carrier C is a carrier signal of which the level is increased and decreased periodically.

The energization pattern generator 35 generates a pattern (energization pattern of the inverter 23) with which the inverter 23 is to be energized. The energization pattern of the inverter 23 may be used interchangeably with a pattern (energization pattern of the motor 4) with which the motor 4 is to be energized. The energization pattern of the inverter 23 includes PWM signals, for three phases, that enable the inverter 23 to be energized. The energization pattern generator 35 includes a PWM signal generator 32 that generates, based on the detected values indicating the phase currents Iu, Iv, and Iw that flow into the motor 4 and that are detected by the current detector 27, the PWM signals for three phases that enable the inverter 23 to be energized such that the motor 4 rotates.

When the energization pattern generator 35 is to generate the energization pattern of the inverter 23 in vector control, the energization pattern generator 35 further includes a vector control unit 30. In the present embodiment, the energization pattern of the inverter is generated in the vector control.

In response to externally receiving a rotation speed command wref for the motor 4, the vector control unit 30 generates a torque current command Iqref and an exciting current command Idref, based on a difference between either a measured value or estimated value for a rotation speed of the motor 4 and the rotation speed command wref. By vector control calculation using a rotor position θ, the vector control unit 30 calculates a torque current Iq and exciting current Id, based on the phase currents Iu, Iv, and Iw for the phases U, V, and W through the motor 4. For example, the vector control unit 30 performs a calculation in PI control, with respect to a difference between the torque current command Iqref and the torque current Iq, and then generates a voltage command Vq. For example, the vector control unit 30 performs a calculation in PI control, with respect to a difference between the exciting current command Idref and the exciting current Id, and then generates a voltage command Vd. The vector control unit 30 converters the voltage commands Vq and Vd into phase voltage commands Vu*, Vv*, and Vw* for the phases U, V, and W, by using the rotor position θ. The rotor position θ represents the pole position of the rotor in the motor 4.

The PWM signal generator 32 generates the energization pattern that includes the PWM signal for a given phase among three phases, by comparing each of the phase voltage commands Vu*, Vv*, and Vw*, which is generated by the vector control unit 30, against the level of the carrier C generated by the carrier generator 37. The PWM signal generator 32 also generates PWM signals for driving the lower arms, which are respectively obtained by inverting three phase PWM signals for driving the upper arms, adds dead time as necessary, and then outputs energization patterns including the generated PWM signals to the drive circuit 33.

In accordance with the energization patterns including the respective PWM signals, the drive circuit 33 outputs drive signals to switch six arms Up, Vp, Wp, Un, Vn, and Wn that are included in the inverter 23. In such a manner, the three-phase drive alternating current is provided to the motor 4, and thus the motor 4 rotates.

Based on the carrier C, which is delivered from the carrier generator 37, and the energization patterns including the respective PWM signals that are generated by the PWM signal generator 32, the current detection-timing adjusting unit 34 determines an acquirement timing at which, within one period of the carrier C, the current detector 27 detects a phase current for any phase of the three phases.

The current detector 27 detects the phase currents Iu, Iv, and Iw by acquiring the detection signal Sd at acquisition timings that are determined by the current detection-timing adjusting unit 34. The current detector 27 detects the phase currents Iu, Iv, and Iw, in a system (a so-called current detection system that uses one shunt) in which a plurality of phase currents are detected through one current detection unit 24.

As a method of estimating a pole position (initial position) of the rotor when a sensorless-permanent magnet synchronous motor is stopped, an approach called inductive sensing is used. The inductive sensing is the approach to detect the pole position of the rotor magnet of the permanent magnet synchronous motor, by using dependency of inductance on the rotor position. Such an approach to detect the position does not use an electromotive force of the motor, and thus the pole position of the rotor magnet can be detected even when the rotor of the motor is stopped or in a state of being at an extremely low velocity. The state of being at the extremely low velocity of the rotor refers to a state in which the rotor is rotating at a low velocity to the extent that the motor controller cannot detect the electromotive force. In the specification, for convenience of explanation, a "state in which the rotor is stopped or at an extremely low velocity" is simply referred to as a "stopped state of the rotor."

The motor controller 100-1 according to the first embodiment includes an initial-position estimating unit 38 that estimates, by inductive sensing, an initial position es, which is a pole position in a state in which the rotor of the motor is stopped. By using the initial position es that is estimated by the initial-position estimating unit 38, the energization pattern generator 35 outputs, to the drive circuit 33, energization patterns including PWM signals that cause the rotor of the motor 4 to rotate. The vector control unit 30 converts voltage commands Vδ and Vγ into phase voltage commands Vu*, Vv*, and Vw*, by using, as an initial value of the rotor position θ, the initial position es estimated by the initial-position estimating unit 38. In the present disclosure, the initial position es is a value corresponding to the width of 30 degrees, as an example. In such a case, the motor 4 is controlled by using a predetermined value that is determined based on the initial position θs.

Figure 2:
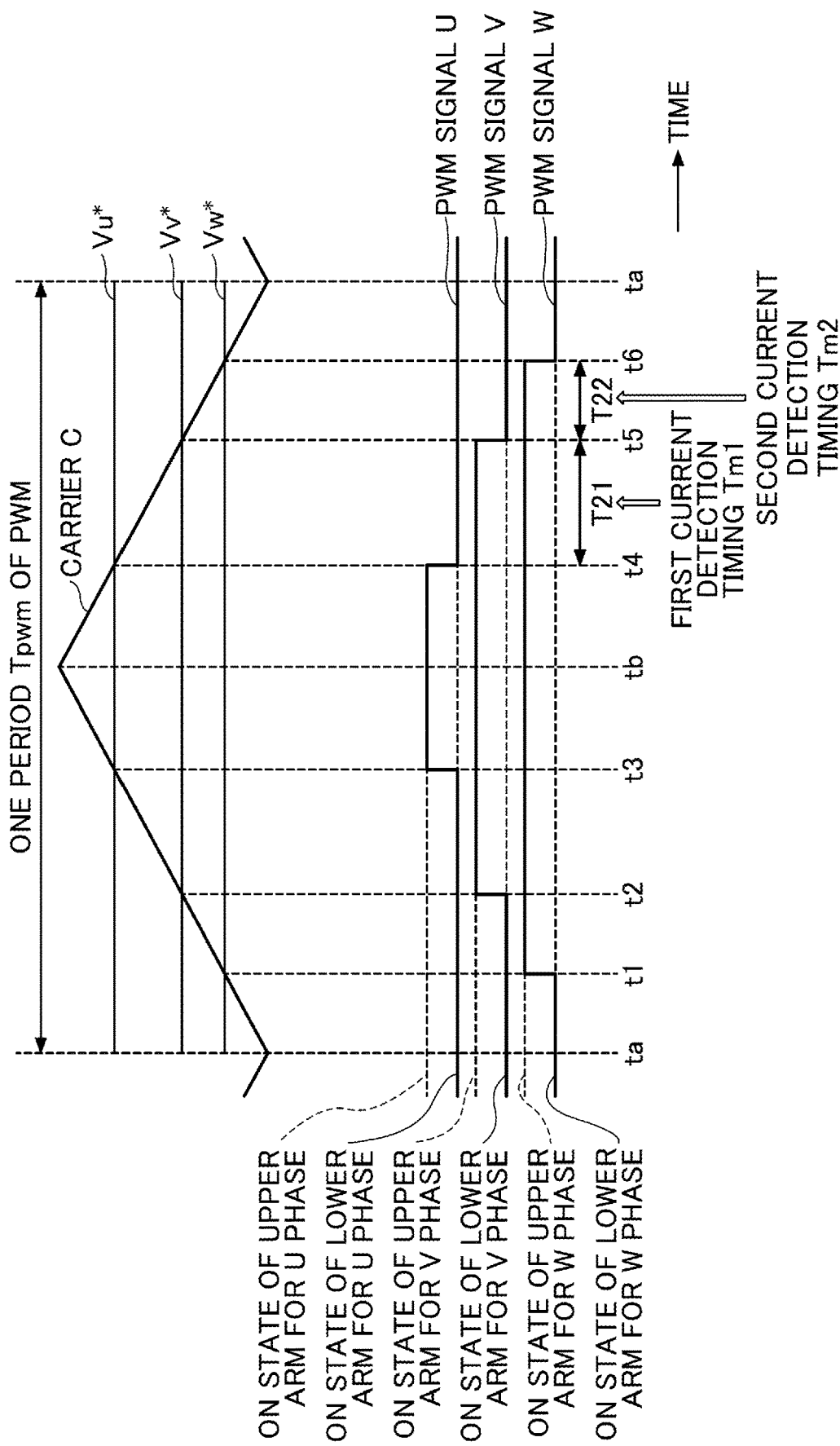
FIG. 2 is a diagram illustrating waveforms of multiple PWM signals, a waveform of a carrier within one period for the PWM signals, and waveforms of phase voltage commands for respective phases.

FIG. 2 is a diagram illustrating waveforms of the PWM signals U, V, and W, the waveform of the carrier C within one period for the PWM signals, and waveforms of phase voltage commands Vu*, Vv*, and Vw* of the respective phases.

The PWM signal generator 32 generates each of the PWM signals U, V, and W, based on the magnitude relationship between a corresponding command, among the phase voltage commands Vu*, Vv*, and Vw* for the respective phases, and the level of the carrier C.

The PWM signal U is a PWM signal for driving two switching elements that constitute the upper and lower arms for the U phase. In this example, when the PWM signal U is at a low level, the switching element of the lower arm for the U phase is on (the switching element of the upper arm for the U phase is off), and when the PWM signal U is at a high level, the switching element of the lower arm for the U phase is off (the switching element of the upper arm for the U phase is on). In response to changes in the level of the PWM signal U, two switching elements constituting the upper and lower arms for the U phase are turned on or off complementarily.

The PWM signal V is a PWM signal for driving two switching elements that constitute the upper and lower arms for the V phase. In this example, when the PWM signal V is at a low level, the switching element of the lower arm for the V phase is on (the switching element of the upper arm for the V phase is off), and when the PWM signal V is at a high level, the switching element of the lower arm for the V phase is off (the switching element of the upper arm for the V phase is on). In response to changes in the level of the PWM signal V, two switching elements constituting the upper and lower arms for the V phase are turned on or off complementarily.

The PWM signal W is a PWM signal for driving two switching elements that constitute the upper and lower arms for the W phase. In this example, when the PWM signal W is at a low level, the switching element of the lower arm for the W phase is on (the switching element of the upper arm for the W phase is off), and when the PWM signal W is at a high level, the switching element of the lower arm for the W phase is off (the switching element of the upper arm for the W phase is on). In response to changes in the level of the PWM signal W, two switching elements constituting the upper and lower arms for the W phase are turned on or off complementarily.

In FIG. 2, illustration of the dead time used to prevent short-circuit of given upper and lower arms is omitted. In FIG. 2, it is defined that, when a given PWM signal is at the high level, the upper arm for a corresponding phase, corresponding to the given PWM signal, is on, and when a given PWM signal is at the low level, the lower arm for a corresponding phase, corresponding to the given PWM signal, is on. However, the relation between a logical level of the PWM signal and each arm to be on or off may be inversely defined in consideration of a circuit configuration or the like.

One period Tpwm of each of the PWM signals U, V, and W corresponds to a period (reciprocal of a frequency of the carrier C) of the carrier C. Change points (t1 to t6) represent timings at which the logic level of the PWM signal transitions.

As illustrated in FIG. 2, the PWM signal generator 32 may generate the PWM signal of each phase by using one carrier C that is shared for the phases. A triangle waveform that is bilaterally symmetrical with respect to a phase tb is used as the carrier C. With this arrangement, a circuit configuration that generates the waveform of a given PWM signal for each phase can be simplified. A counter for the carrier C decrements a count up to a phase ta, increments a count from the phase ta to the phase tb, and decrements a count after the phase tb. With this arrangement, an increment period and a decrement period are repeated. The PWM signal generator 32 may respectively generate PWM signals for phases, by using a plurality of carriers C corresponding to the respective phases, or may generate the PWM signal of each phase by any other known method.

FIG. 2 illustrates a case where a first current detection timing Tm1 is set within an energization period T21 and a second current detection timing Tm2 is set within an energization period T22. The energization periods within which the first current detection timing Tm1 and the second current detection timing Tm2 are set are not limited to the periods described above.

In a state where the inverter 23 outputs a three-phase alternating current modulated in PWM, the current detector 27 can detect the current for a particular phase, based on a corresponding pattern among the energization patterns for the upper arms Up, Vp, and Wp. Alternatively, in the state where the inverter 23 outputs a three-phase alternating current modulated in PWM, the current detector 27 may detect the current for a particular phase, based on a corresponding pattern among the energization patterns for the lower arms Un, Vn, and Wn.

For example, as illustrated in FIG. 2, within an energizing time period T21, the magnitude of the voltage occurring across both ends of the current detection unit 24 corresponds to the magnitude of the current that is a positive U-phase current "+Iu" flowing via the U-phase terminal of the motor 4. The energizing time period T21 is a period from t4 to t5. The energizing time period T21 corresponds to a period during which the lower arm Un and the upper arms Vp and Wp are in an on state and the remaining three arms are in an off state. Thus, by acquiring the detection signal Sd at the first current detection timing Tm1 set within the energizing time period T21, the current detector 27 can detect the magnitude of the current that is a positive U-phase current "+Iu" flowing via the U-phase terminal of the motor 4.

After a predetermined delay time td elapses from the time when the level of a given PWM signal for one phase, among the PWM signals, shifts to a different logic level from PWM signals for remaining two phases (for example, t4: a timing at which the level of a given PWM signal for the U phase changes from the same high level as levels of PWM signals for the V phase and W phase, to a different low level from levels of the PWM signals for the V phase and W phase), the current detection-timing adjusting unit 34 sets the first current detection timing Tm1. At this time, the current detection-timing adjusting unit 34 sets the first current detection timing Tm1 within the energizing time period T21.

Also, for example, as illustrated in FIG. 2, in an energizing time period T22, the magnitude of the voltage occurring across the both ends of the current detection unit 24 corresponds to the magnitude of the current that is a negative W-phase current "−Iw" flowing via the W-phase terminal of the motor 4. The energizing time period T22 is a period from t5 to t6. The energizing time period T22 corresponds to a period in which the lower arms Un and Vn and the upper arm Wp are in an on state and the remaining three arms are in an off state. Thus, by acquiring the detection signal Sd at the second current detection timing Tm2 set within the energizing time period T22, the current detector 27 can detect a negative W-1 phase current "−Iw" that flows via the W-phase terminal of the motor 4.

After a predetermined delay time td elapses from the time when the level of a given PWM signal for one phase, among the PWM signals, shifts to a different logic level from PWM signals for remaining two phases (for example, t5: a timing at which the level of a given PWM signal for the V phase changes from the same high level as a level for the W phase, to the same low level as that for the U phase, so that the level for the W phase becomes a different logical level from levels for the U phase and V phase), the current detection-timing adjusting unit 34 sets the second current detection timing Tm2. At this time, the current detection-timing adjusting unit 34 sets the second current detection timing Tm2 within the energizing time period T22.

Likewise, the current detector 27 can also detect the magnitude of a given current for another phase.

As described above, when currents for two phases, among the phase currents Iu, Iv, and Iw, are sequentially detected based on energization patterns that include PWM signals for three phase, and then the detected currents are stored, three-phase phase currents can be detected by time division. In view of a total sum of the three-phase phase currents being zero (iu+iv+iw=0), if the current detector 27 can detect phase currents for two phases of three phases, the current detector 27 can also detect a phase current for the remaining one phase.

Figure 3:
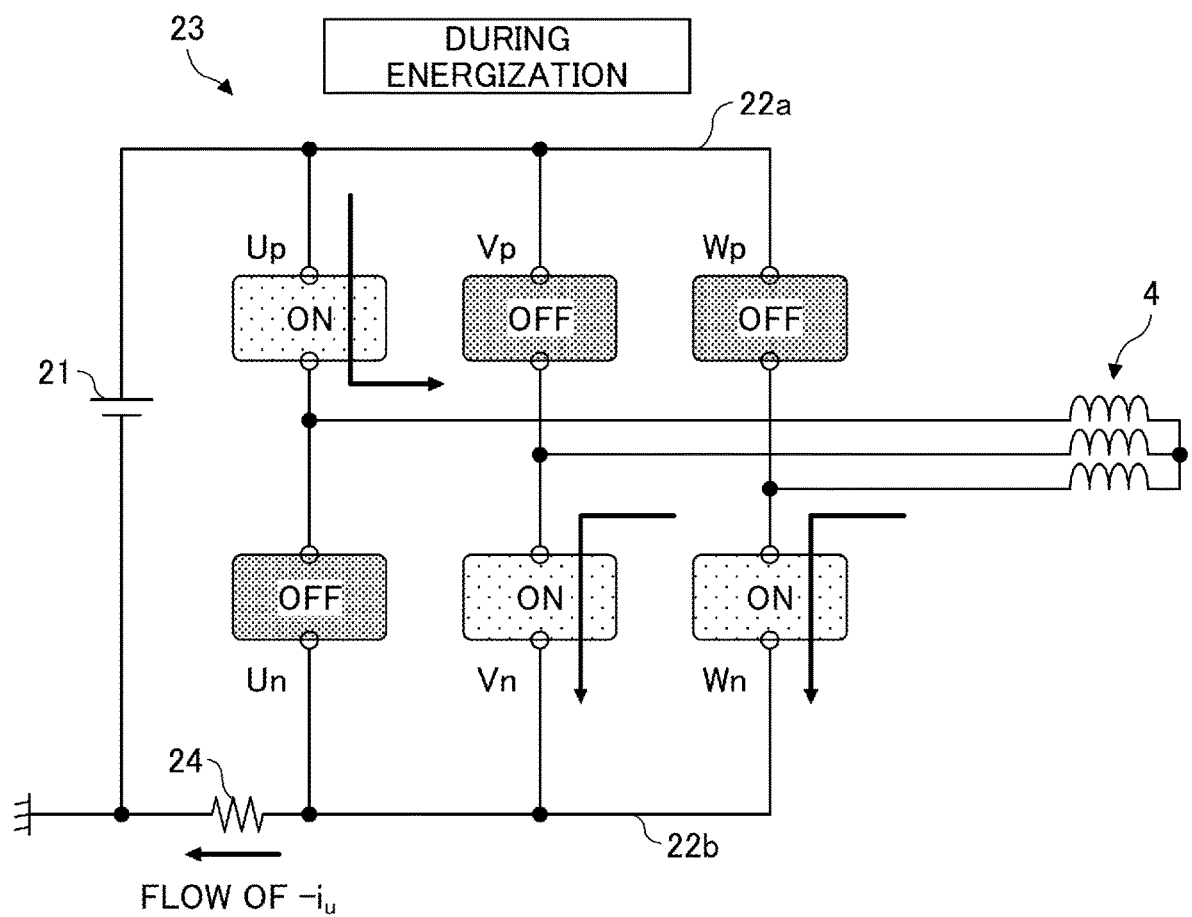
FIG. 3 is a diagram illustrating an example of a switching state for each arm that is energized.
Figure 4:
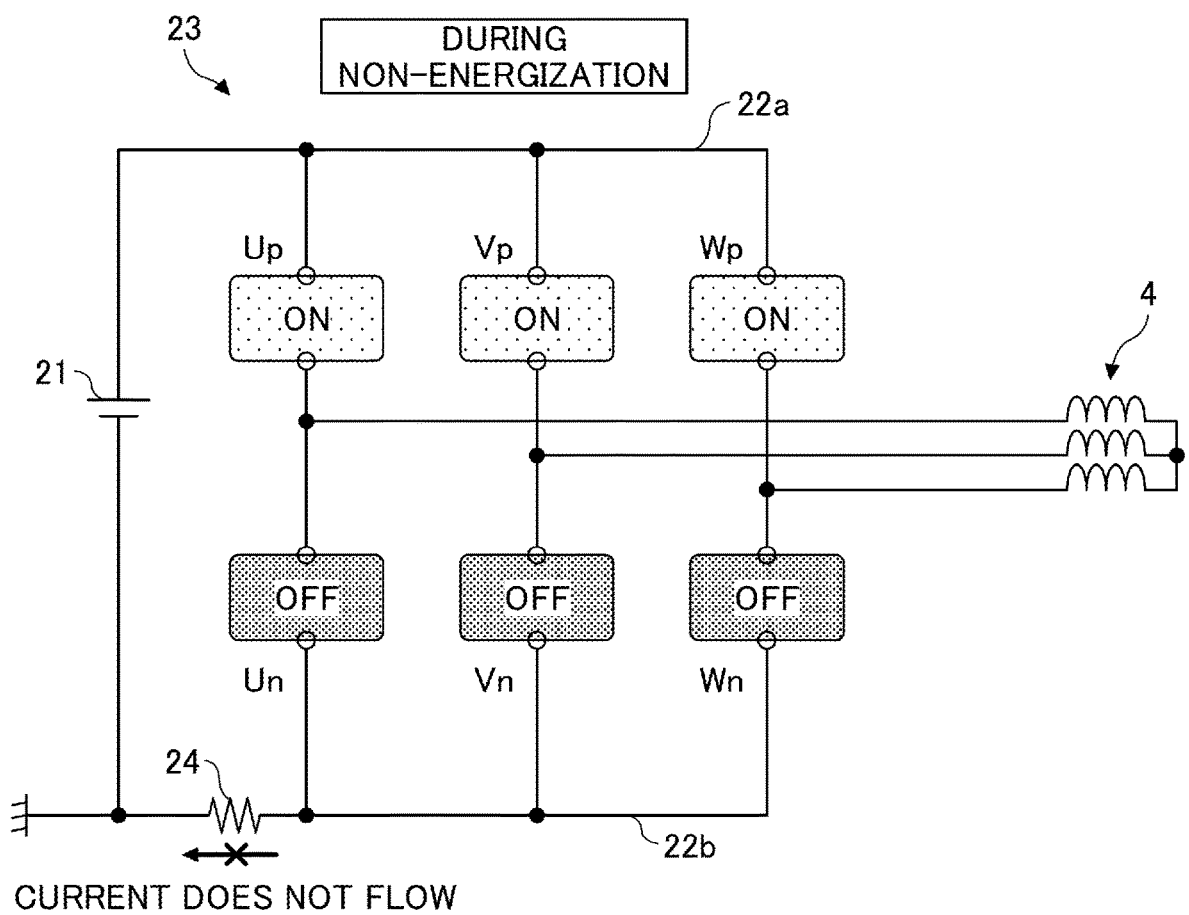
FIG. 4 is a diagram illustrating an example of the switching state for each arm that is not energized.

FIG. 3 is a diagram illustrating an example of a switching state for each arm that is energized. FIG. 4 is a diagram illustrating an example of a switching state for each arm that is not energized. As illustrated in FIG. 3, in a given energization period in which the upper arm Up and the lower arms Vn and Wn are in an on state and the remaining three arms are in an off state, the current detector 27 can detect the magnitude of the current that is the negative U-phase current "−Iu" flowing via the U-phase terminal of the motor 4. In contrast, as illustrated in FIG. 4, in a state in which all the upper arms Up, Vp, and Wp are in an on state and all the lower arms Un, Vn, and Wn are in an off state, the current does not flow through the current detection unit 24, and thus the current detector 27 cannot detect the phase current for each phase. Even in a state in which all the upper arms Up, Vp, and Wp are in an off state and all the lower arms Un, Vn, and Wn are in an on state, the current does not flow into the current detection unit 24, and thus the current detector 27 cannot detect the phase current for each phase.

As described above, in the current detection system that uses one shunt, the phase current for each phase cannot be detected unless any energization period (energizing time period) is provided. In the current detection system that uses one shunt, since the phase current that can be detected using one energizing time period corresponds to only one phase, at least two energizing time periods are provided during one period of the PWM signal (see FIG. 2), and then phase currents for three phases are separately detected based on an equation of (iu+iv+iw=0). However, when the energizing time periods are provided in order to separately detect the phase currents for the phases, the current flowing into the current detection unit 24 is amplified. With this arrangement, when the current flowing into the current detection unit 24 is zero, the current detector 27 cannot measure a detection error that is included in a detected value of the phase current for each phase.

Therefore, when the motor is stopped, in a case where a portion of all arms of the inverter 23 is turned on in accordance with the PWM signal, for each phase, having the same duty ratio, the current of each phase flowing into the current detection unit 24 may be defined as an offset current. In this case, the current detector 27 detects, as a current magnitude (detection error) of the offset current, a current magnitude of the offset current, for each phase, flowing into the current detection unit 24, by turning on a portion of all arms of the inverter 23 in accordance with the PWM signal, for each phase, having the same duty cycle.

Figure 5:
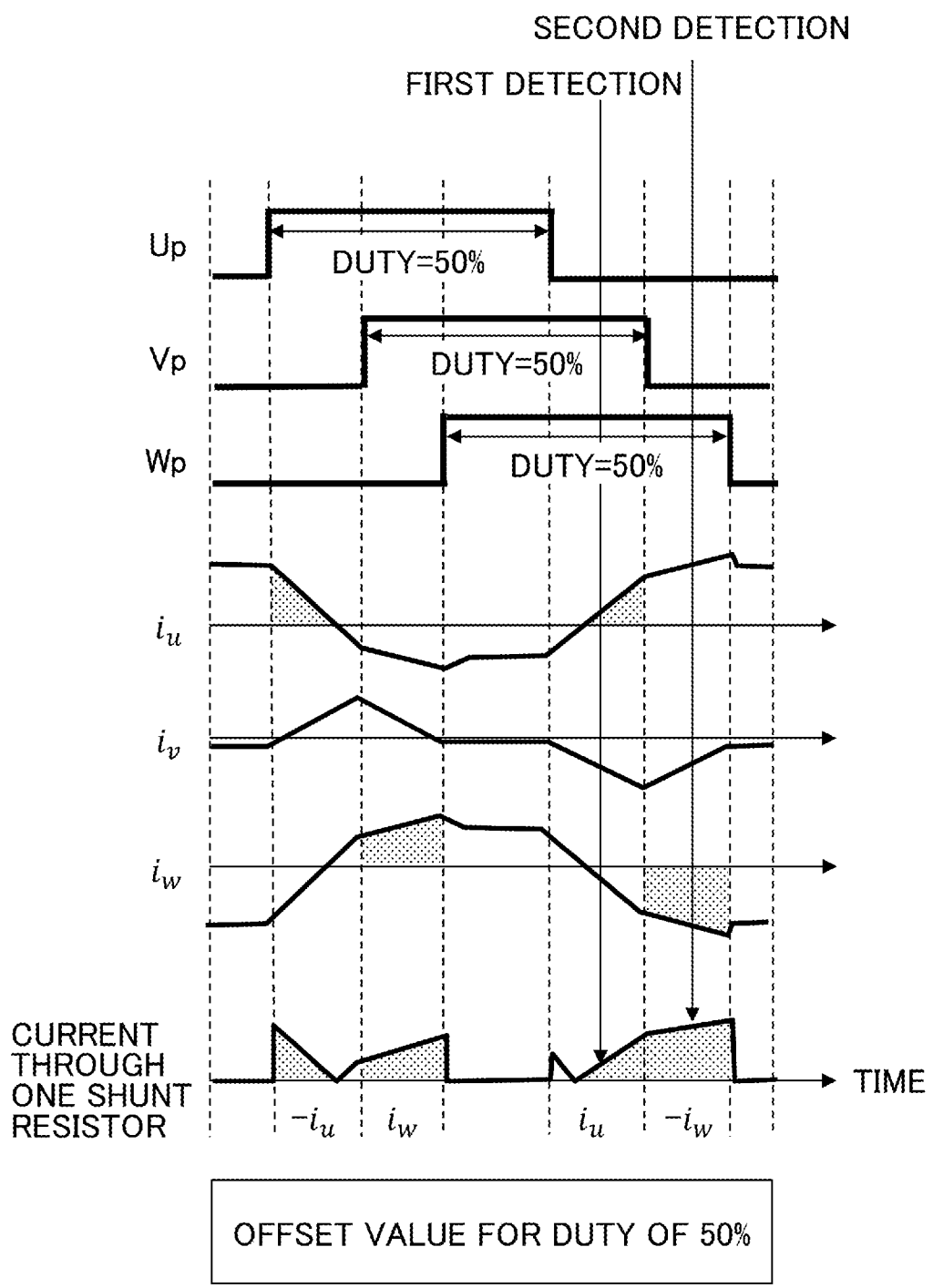
FIG. 5 is a timing chart illustrating an offset current for each phase flowing through a current detection unit, by turning on a portion of all arms of an inverter in accordance with the PWM signal for a corresponding phase, with a duty cycle of 50%.
Figure 6:
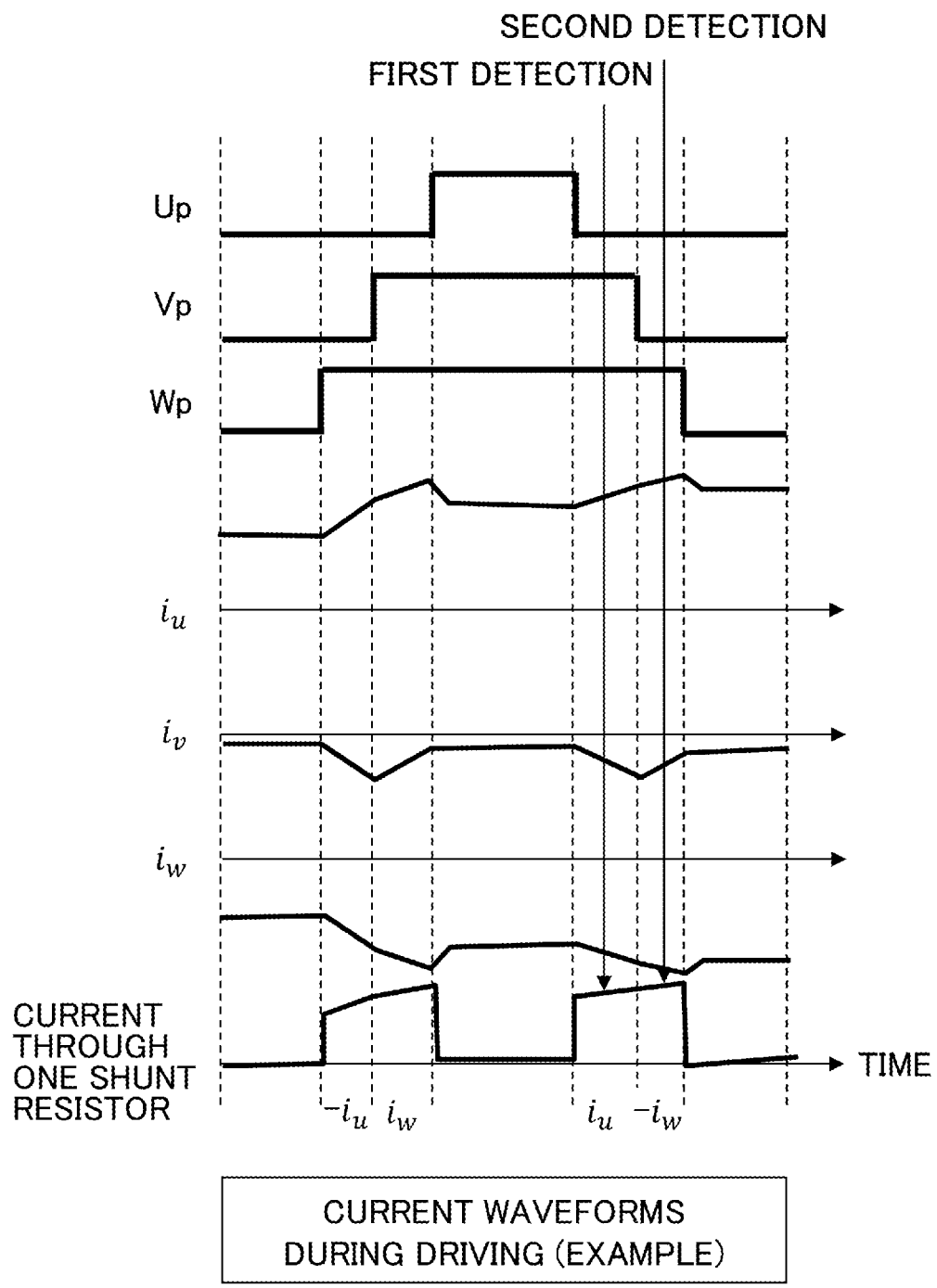
FIG. 6 is a timing chart illustrating a phase current for each phase flowing through the current detection unit, by turning on the same portion of all arms as illustrated in FIG. 5, while the inverter rotates the rotor in accordance with the PWM signal for a corresponding phase, with a duty cycle different from the duty cycle of 50%.

FIG. 5 is a timing chart illustrating the offset current for each phase flowing through the current detection unit 24, by turning on a portion of all arms of the inverter 23 in accordance with the PWM signal for a corresponding phase, with a duty cycle of 50%, as an example. FIG. 6 is a timing chart illustrating the phase current for each phase flowing through the current detection unit 24, by turning on the same portion of all arms as illustrated in FIG. 5, while the inverter 23 rotates the rotor in accordance with the PWM signal for a corresponding phase, with a duty cycle different from the duty cycle of 50%.

In FIG. 5, the current detector 27 detects the current magnitude of each of offset currents for the three phases, by performing current detection at least two times for each period of the PWM signal, before the inverter 23 rotates the rotor (before the motor 4 starts up). The current detector 27 stores detected current magnitudes in the memory, as offset current magnitudes for the three phases. FIG. 5 illustrates a case in which the current detector 27 detects offset current magnitudes for the positive U-phase current "Iu" and the negative W-phase current "−Iw", detects (calculates) an offset current magnitude of the remaining V-phase current, based on detected results for the positive U-phase current and the negative W-phase current, and then stores the detected offset current magnitudes for the three phases. After the offset current magnitudes for the three phases are stored in the memory, the motor 4 starts with the inverter 23, and thus the inverter 23 rotates the rotor.

In FIG. 6, while the inverter 23 rotates the rotor in accordance with the PWM signal for each phase with any duty cycle that is different from the duty cycle of 50%, the current detector 27 detects the current magnitude of the phase current for each of the three phases, by performing, for each one period of the PWM signal, current detection at least two times, with the same energization pattern as the energization pattern described in FIG. 5. The current detector 27 calculates the detected current magnitude for each of the phase currents Iu, Iv, and Iw of the three phases, by subtracting, for each period of the PWM signal, the offset current magnitude for a corresponding phase among the three phases, which is stored in advance in the memory, from the current magnitude of the phase current, for the corresponding phase among the three phases, that is detected for a corresponding period of the PWM signal. With this arrangement, detection error is removed from the detected current magnitude for each of the phase currents Iu, Iv, and Iw for the three phases. While the inverter 23 rotates the rotor, the PWM signal generator 32 generates the three phase PWM signal, based on the detected current magnitude, from which detection error is removed, for each of the phase currents Iu, Iv, and Iw for the three phases. Thus, rotation of the motor 4 can be controlled by the inverter 23, with high accuracy.

Even in a state in which the inverter 23 does not rotate the rotor in accordance with the three phase alternating current, there are cases where the rotor is idling due to disturbance such as wind. In particular, the rotor that rotates a rotating body, such as a fan having a relatively low frictional resistance, is likely to be idling. While the rotor is idling before the inverter 23 rotates the rotor in accordance with the three-phase alternating current, when the current flowing through the current detection unit 24 is detected, there are cases where rotation of the rotor is inhibited by regenerative braking that is produced at the idling rotor. When the rotation of the idling rotor is inhibited, unintended behaviors such as deceleration or abnormal noise of the motor 4 may occur.

Figure 7:
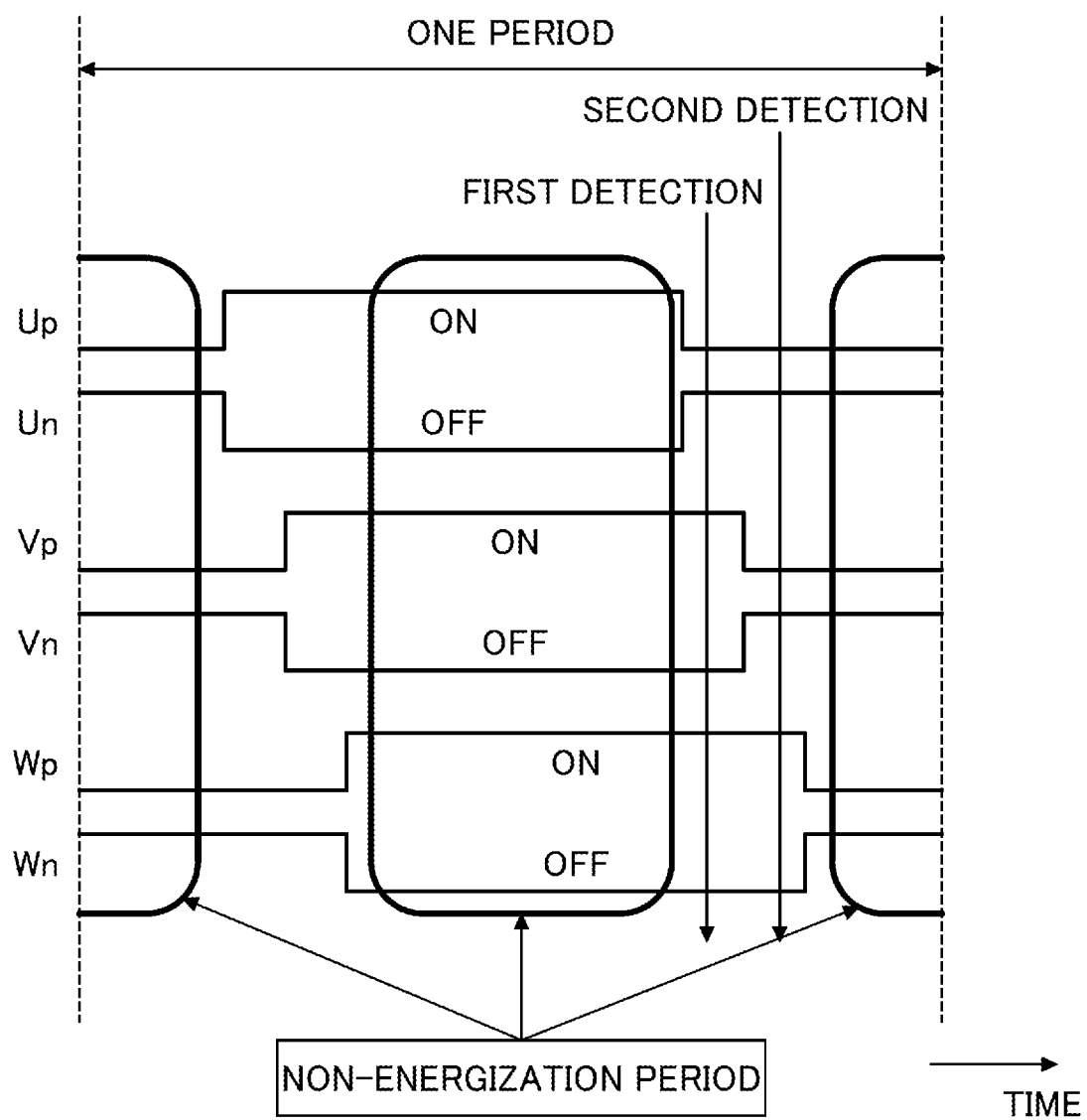
FIG. 7 is a diagram illustrating one comparative example of waveforms of PWM signals when a current magnitude of the current flowing through the current detection unit is detected before the inverter rotates the rotor.

FIG. 7 illustrates one comparative example of the waveforms of the PWM signals obtained when the current magnitude of the current flowing through the current detection unit is detected before the inverter rotates the rotor, and illustrates a case where the duty cycle of the PWM signal for each phase is 50%. Depending on the waveform of the PWM signal for each phase, a period (regeneration period) during which a regenerative current flows, as well as a period (non-regeneration period) during which the regenerative current does not flow, are generated. A non-energization period illustrated in FIG. 7 corresponds to the regeneration period. In the regeneration period (non-energization period), all upper arms or all lower arms are in the on state.

Figure 8:
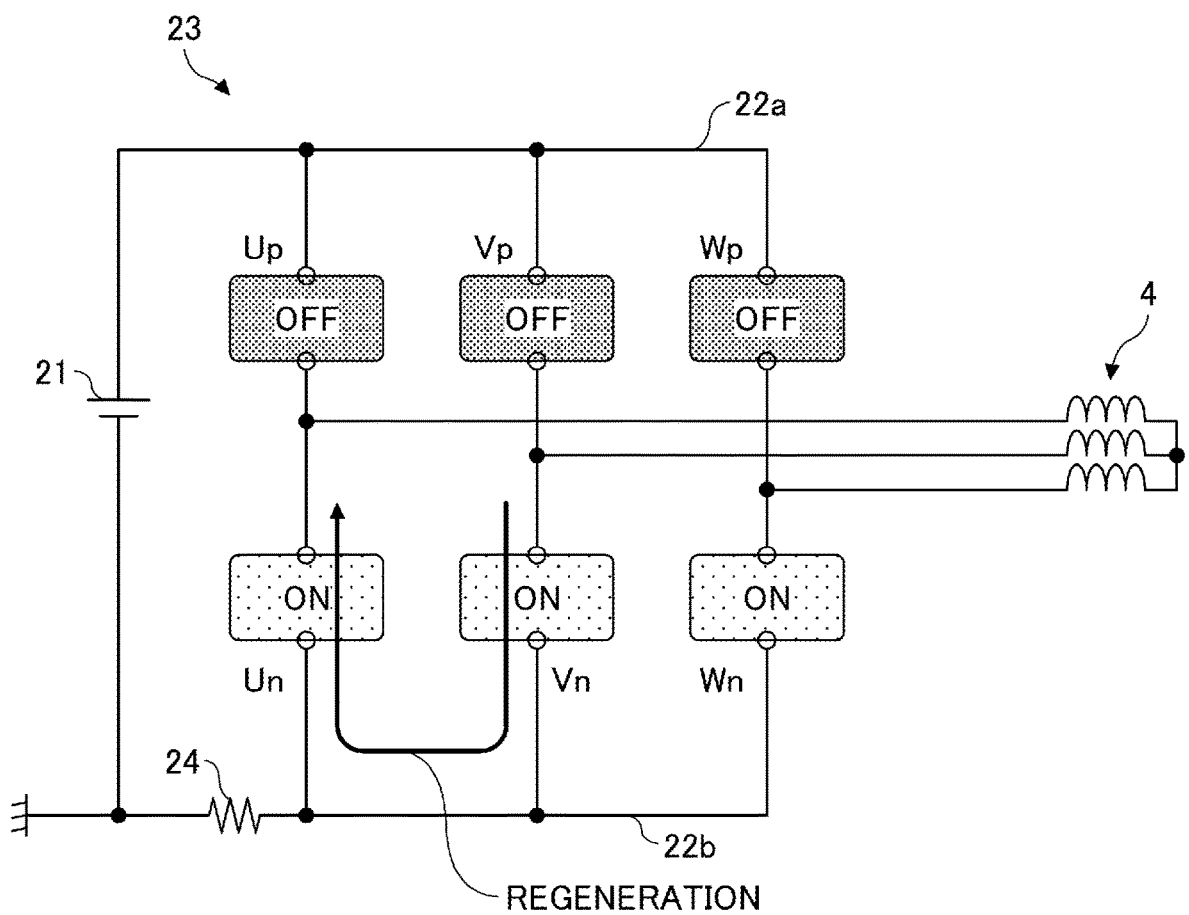
FIG. 8 is a diagram illustrating a case where all lower arms are in an on state during each of non-energization periods.
Figure 9:
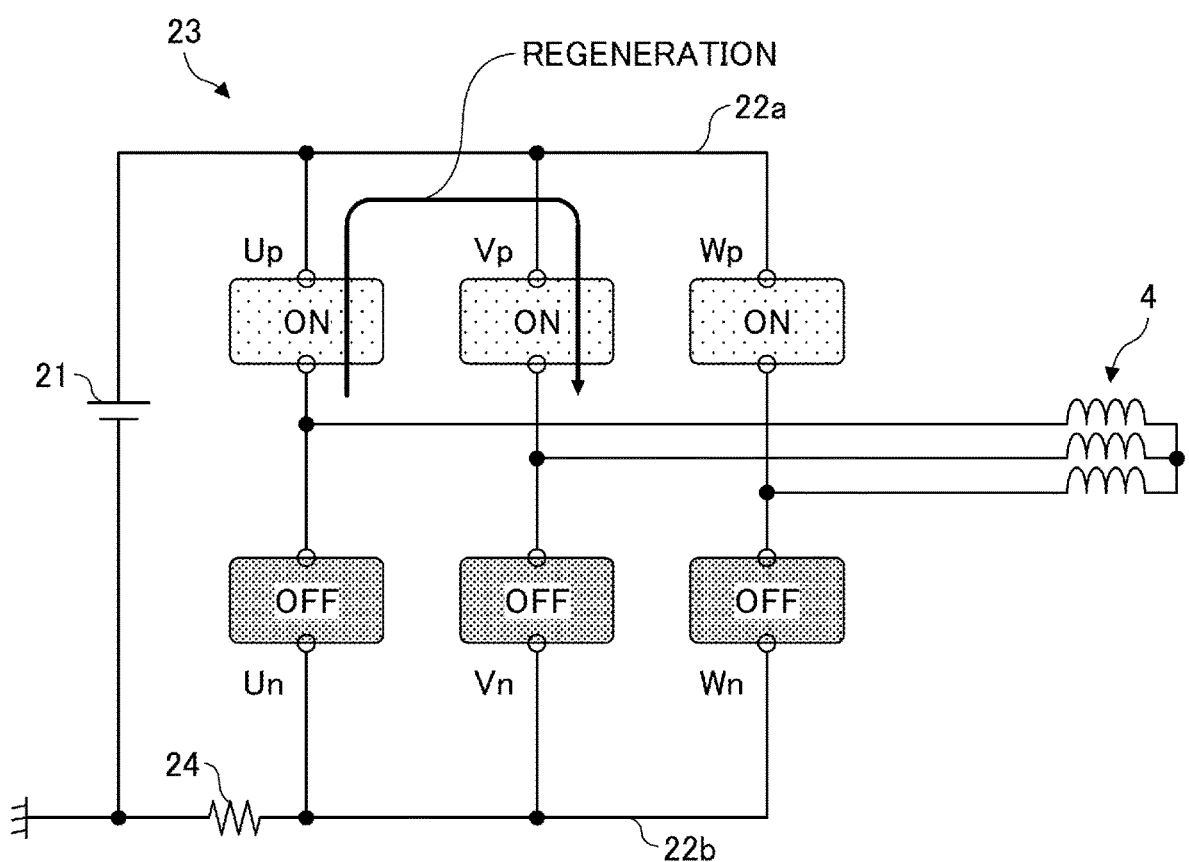
FIG. 9 is a diagram illustrating a case where all upper arms are in the on state during a non-energization period.

FIG. 8 is a diagram illustrating a case where all the lower arms are in the on state during non-energization periods, and illustrates a switching state during each of the non-energization periods that are present on both sides of FIG. 7. FIG. 9 is a diagram illustrating a case where all the upper arms are in the on state during a non-energization period, and illustrates a switching state during an intermediate non-energization period that is interposed between the non-energization periods present on both sides of FIG. 7. When the rotor of the motor 4 is idling due to an external force such as wind, electromotive forces are respectively generated through coils, for the phases, of the motor 4 due to the idling of the rotor. By such electromotive forces, as illustrated in each of FIGS. 8 and 9, in one or more non-energization periods illustrated in FIG. 7, a regenerative current flowing from the motor 4 into the inverter 23 is generated, and thus regenerative braking is applied to the idling rotor. When rotation of the idling rotor is inhibited by the regenerative braking, an unintended behavior, such as deceleration or abnormal noise of the motor, may occur.

<First Current Detection Method Performed During Idle Time of Rotor>

Figure 10:
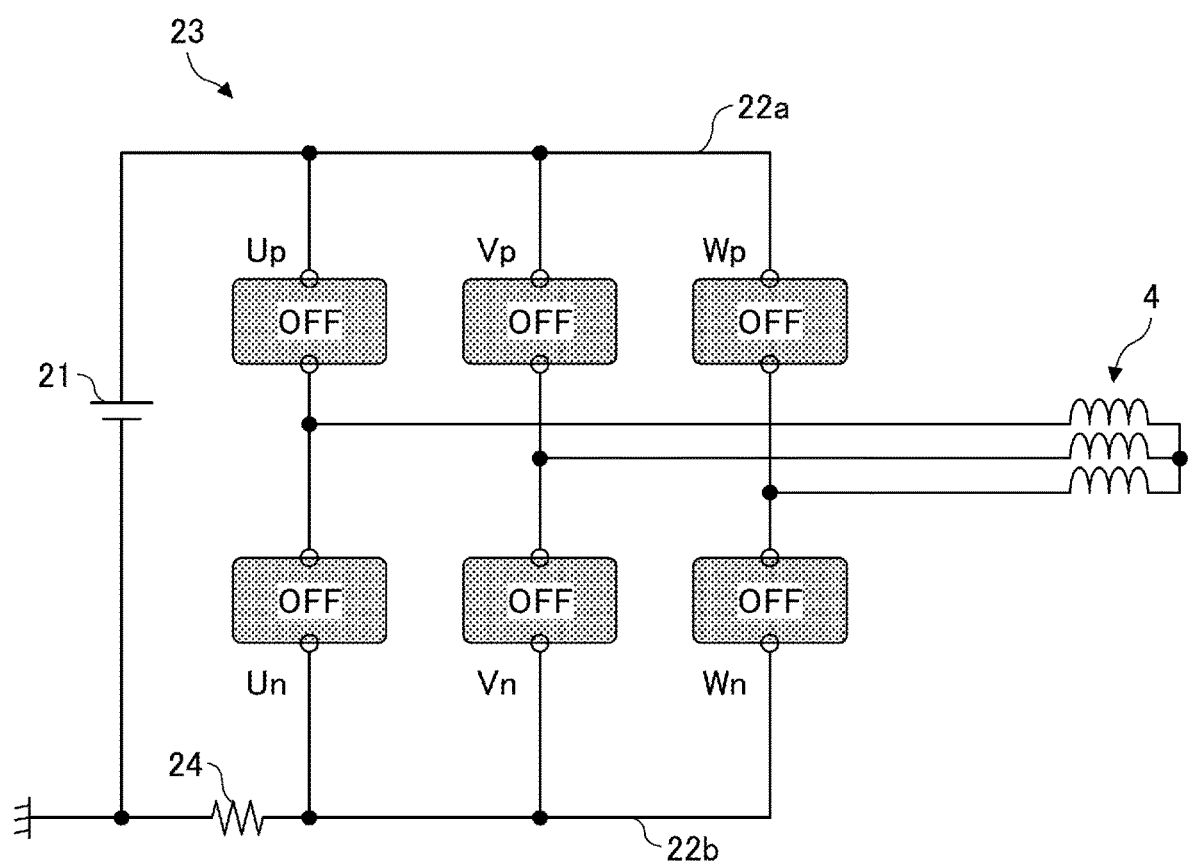
FIG. 10 is a diagram illustrating a case where all of the upper and lower arms are in an off state in a non-energization period.

In a "first current detection method performed during the idle time of the rotor" in the present disclosure, the PWM signal generator 32 generates the PWM signal for each phase to set all arms of the inverter 23 in the off state, as illustrated in FIG. 10, such that the regenerative current does not flow during a given non-energization period. With this arrangement, even while the rotor is idling, all the arms of the inverter 23 becomes in the off state during the given non-energization period, and thus the regenerative current flowing from the motor 4 into the inverter 23 is not theoretically generated. Therefore, inhibition of rotation of the rotor due to the regenerative braking that is applied to the idling rotor is reduced. Accordingly, possibility of an unintended behavior, such as deceleration or abnormal noise of the motor 4, can be reduced.

Figure 11:
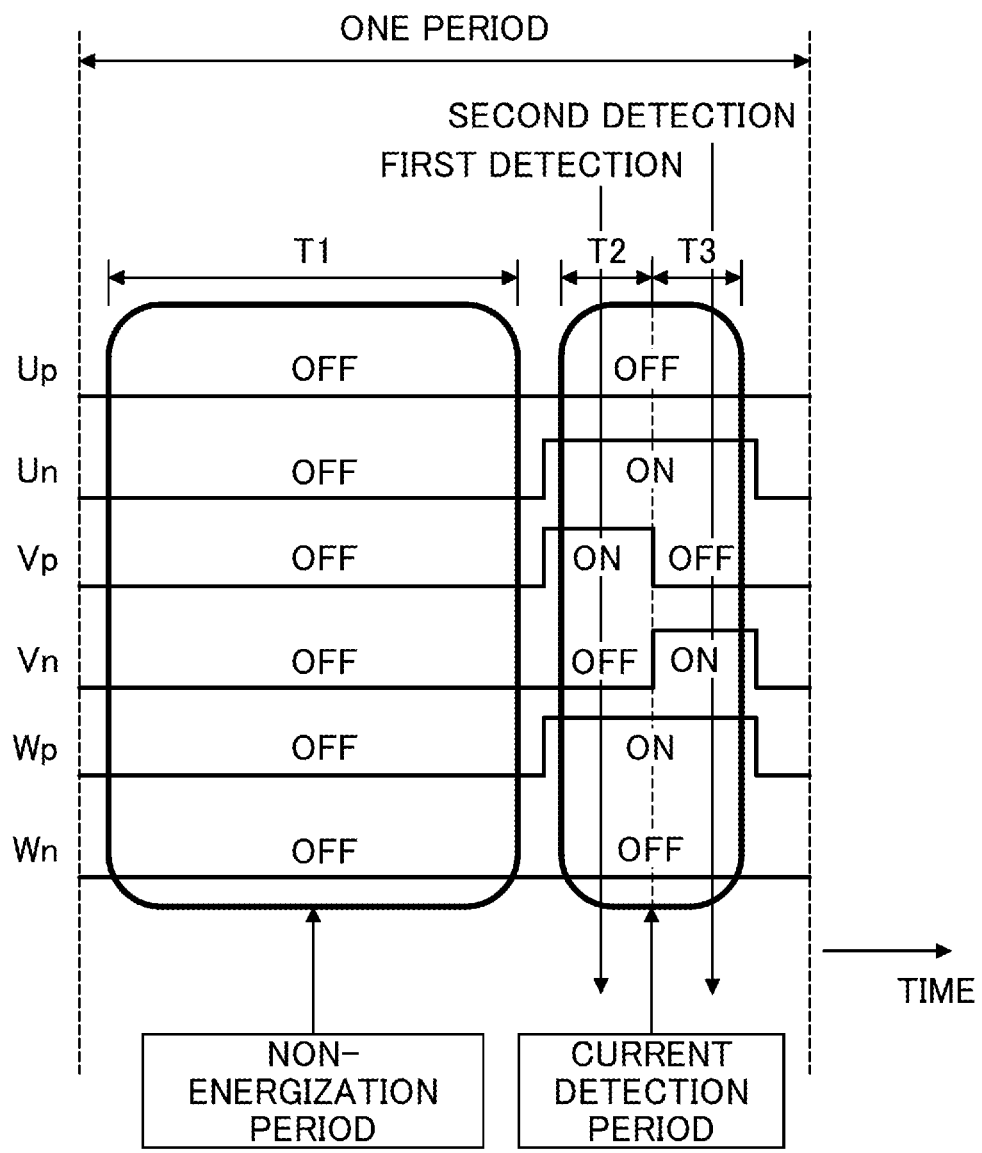
FIG. 11 is a diagram illustrating a first example of the waveforms of the PWM signals obtained in a case where the current magnitude of the current flowing through the current detection unit is detected before the inverter rotates the rotor.

FIG. 11 is a diagram illustrating a first example of the waveforms of the PWM signals obtained in a case where the current magnitude of the current flowing through the current detection unit is detected before the inverter rotates the rotor. The inverter 23 turns on a different portion of the arms, for each energization pattern, among all the arms, to thereby energize the motor 4 having the rotor. The PWM signal generator 32 generates the PWM signal, for each phase, that includes, within one period, a first period during which all arms are turned off during the idle time of the rotor, a second period during which, during the idle time of the rotor, a portion of the arms is turned on with a first energization pattern, and a third period during which, during the idle time of the rotor, a portion of the arms is turned on with a second energization pattern. With this arrangement, the switching state of each arm, as illustrated in FIG. 11, is obtained.

In the example illustrated in FIG. 11, the non-energization period T1, during which all arms are in the off state, is an example of a first period, a first half period T2 of the current detection period, during which a portion of the arms is turned into the on state with the first energization pattern, is an example of a second period, and a second half period T3 of the current detection period, during which a portion of the arms is turned into the on state with the second energization pattern, is an example of a third period.

In the first half period T2 (which is an example of the second period) of the current detection period, because the lower arm Un and the upper arms Vp and Wp are turned to the on state with the first energization pattern, a positive U-phase current "+Iu" flowing out from the U-phase terminal of the motor 4 flows into the current detection unit 24. In the second half period T3 (which is an example of the third period) of the current detection period, because the lower arms Un and Vn and the upper arm Wp are turned to the on state with the second energization pattern, a negative W-phase current "−Iw" flowing in from the W-phase terminal of the motor 4 flows into the current detection unit 24. The current detector 27 detects a first reference current (in this example, the positive U-phase current "+Iu") flowing into the current detection unit 24 during the first half period T2, as well as a second reference current (in this example, the negative W-phase current "−Iw") flowing into the current detection unit 24 during the second half period T3.

As described above, according to the first current detection method, since all the arms are in the off state during the non-energization period T1, generation of unnecessary torque that causes regenerative braking is suppressed. Therefore, during the idle time of the rotor, which occurs before the inverter 23 rotates the rotor with the three phase alternating current, even if the current detector 27 detects the current flowing through the current detection unit 24 during a given current detection period, idling of the rotor is unlikely to be inhibited, because the non-energization period T1 during which all the arms are in the off state is present.

In the example illustrated in FIG. 11, the current detection period, which is an example of a total period of the second period and the third period, is set to be shorter than the non-energization period, which is an example of the first period. Within the non-energization period, since a state in which regenerative braking is produced is interrupted, generation of unnecessary torque that causes the regenerative braking is suppressed. However, since the current detection period is shorter than the non-energization period, only a minute current flows during an energizing time period, within the current detection period. With this arrangement, during the idle time, of the rotor, occurring before the inverter 23 rotates the rotor with the three phase alternating current, even if the current detector 27 detects the current flowing through the current detection unit 24 during the current detection period, inhibition of the rotation of the idling rotor is reduced. As a result, occurrence of an unintended behavior such as deceleration or abnormal noise of the motor 4 can be suppressed.

For example, while the inverter 23 rotates the rotor, the current detector 27 may correct the phase current for a first phase flowing through the current detection unit 24, in accordance with the first reference current, for the first phase, detected during the second period. Similarly, while the inverter 23 rotates the rotor, the current detector 27 may correct the phase current for the second phase flowing through the current detection unit 24, in accordance with the second reference current, for the second phase, detected during the second period. For example, the first phase is the U phase and the second phase is the W phase. However, any other combination may be used. The current does not flow through the current detection unit 24 during the first period, within one period. Thus, the first reference current flowing through the current detection unit 24 during the second period, as well as the second reference current flowing through the current detection unit 24 during the third period, can be used as reference currents for two phases, as in the offset currents described above.

For example, the current detector 27 may use the fact that a total sum of the phase currents for the three phases is 0, to detect (calculate), based on the first reference current for the first phase detected during the second period and the second reference current for the second phase detected during the third period, a third reference current for a third phase flowing through the current detection unit 24 during the idle time of the rotor. The third reference current for the third phase can be also used as a reference current of one phase, as in the offset current described above. The third phase is, for example, the V phase. When the inverter 23 rotates the rotor, the current detector 27 may correct the phase current for the third phase flowing through the current detection unit 24, in accordance with the detected (calculated) third reference current for the third phase.

For example, the magnitude of the first reference current for the first phase is set as the magnitude of the first reference current, the magnitude of the second reference current for the second phase is set as the magnitude of the second reference current, and the magnitude of the third reference current for the third phase is set as the magnitude of the third reference current. The current detector 27 detects the magnitude of the first reference current during the second period, detects the magnitude of the second reference current during the third period, and detects (calculates) the magnitude of the remaining third reference current, from detection results for the first reference current and the second reference current. The current detector 27 stores, in a memory, the detected magnitudes of the reference currents for the three phases. After the magnitudes of the reference currents for the three phases are stored in the memory, the motor 4 starts with the inverter 23, and then the inverter 23 rotates the rotor.

While the inverter 23 rotates the rotor, the current detector 27 detects the current magnitude of each of phase currents for the three phases, by performing current detection at least two times with the same energization pattern as the energization pattern described in FIG. 11, for each period of the PWM signal. The current detector 27 calculates the detected current magnitude for each of the phase currents Iu, Iv, and Iw for the three phases, by subtracting, for each one period of the PWM signal, the reference current magnitude for a corresponding phase among the three phases, which is stored in advance in the memory, from the current magnitude of the phase current, for the corresponding three phases, that is detected for each one period of the PWM signal. With this arrangement, while the inverter 23 rotates the rotor, the current detector 27 corrects the phase current for each phase flowing through the current detection unit 24, in accordance with a corresponding reference current for each phase. Thus, detection error is removed from the detected current magnitude of each of the phase currents Iu, Iv, and Iw for the three phases. While the inverter 23 rotates the rotor, the PWM signal generator 32 generates the three phase PWM signal, by using the detected current magnitude, from which detection error is removed, for each of the corrected phase currents Iu, Iv, and Iw for the three phases.

Thus, rotation of the motor 4 can be controlled by the inverter 23, with high accuracy.

As a method other than the above method, for example, without using a PWM function, a general-purpose port function may be used to output only an on or off signal from a port, so that the state illustrated in FIG. 10 is provided.

<Second Current Detection Method Performed During Idle Time of Rotor>

Hereafter, a "second current detection method performed during the idle time of the rotor" in the present disclosure will be described.

Figure 12:
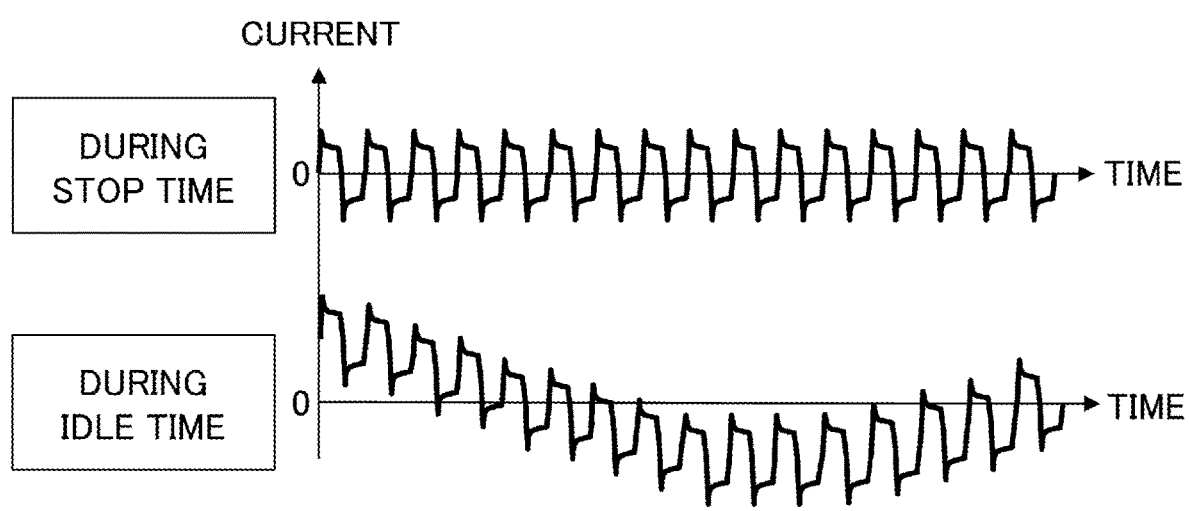
FIG. 12 is an enlarged view of an example of a current waveform of a U-phase current flowing through the current detection unit, when a portion of all arms of the inverter is turned on in accordance with the PWM signal, of each phase, having a duty cycle of 50%.

As an example, FIG. 12 is an enlarged view of an example of a current waveform of the U-phase current flowing through the current detection unit 24, when a portion of all the arms of the inverter is turned on in accordance with the PWM signal, of each phase, having a duty cycle of 50%. In FIG. 12, an upper waveform is obtained during a stop time of the rotor, and a lower waveform is obtained during the idle time of the rotor. FIG. 12 illustrates the waveform of each PWM signal obtained during about 16 periods. Two waveforms are shifted vertically without substantial changes, and the vertical shift is caused by the electromotive force that is generated through the coil for each phase of the motor 4 due to idling of the rotor.

Figure 13:
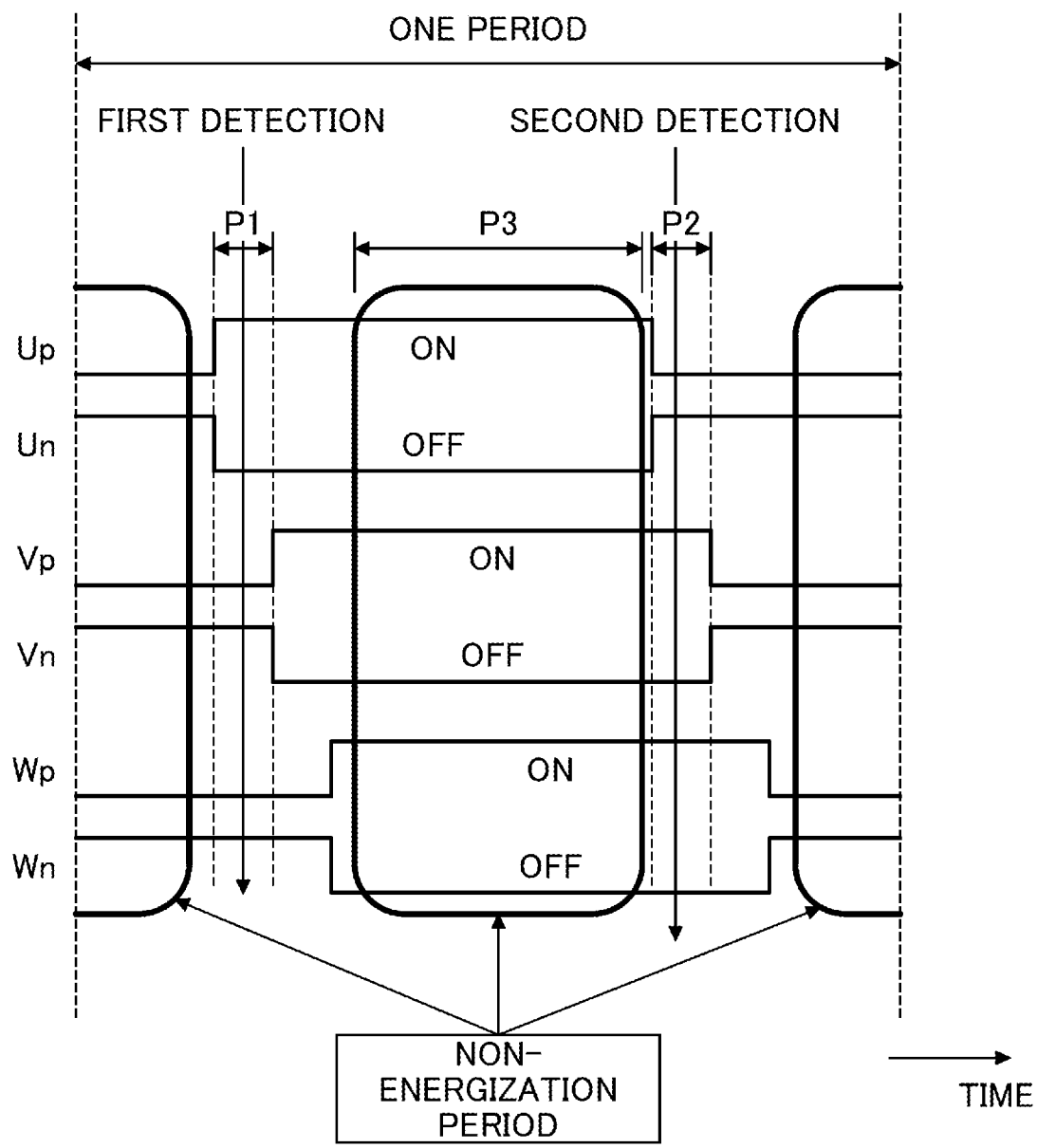
FIG. 13 is a diagram illustrating a second example of the waveforms of the PWM signals obtained when the current magnitude of the current flowing through the current detection unit is detected before the inverter rotates the rotor.

FIG. 13 is a diagram illustrating a second example of the waveforms of the PWM signals obtained when the current magnitude of the current flowing through the current detection unit 24 is detected before the inverter rotates the rotor. The inverter 23 turns on a different portion of the arms, for each energization pattern, among all the arms, to thereby energize the motor 4 having the rotor. The PWM signal generator 32 generates the PWM signal for each phase, with the duty cycle of the same value, and the PWM signal includes a first period length that is defined by a first period during which all arms are turned on during the idle time of the rotor; a second period during which, during the idle time of the rotor, a portion of the arms is turned on with a first energization pattern; and a third period during which, during the idle time of the rotor, all the upper arms or all the lower arms are turned on with a third energization pattern. With this arrangement, the switching state of each arm, as illustrated in FIG. 13, is obtained.

In the example illustrated in FIG. 13, a first current detection period P1 (a period within which a timing of first detection is indicated), during which a portion of the arms is turned to the on state, with the first energization pattern is an example of the first period, and a second current detection period P2 (a period within which a timing of second detection is indicated), during which a portion of the arms is turned to the on state, with the second energization pattern is an example of the second period. A non-energization period P3 during which all the upper arms are in the on state and all the lower arms are in the off state is an example of the third period. In this example, the third period is present between the first period and the second period.

Figure 14:
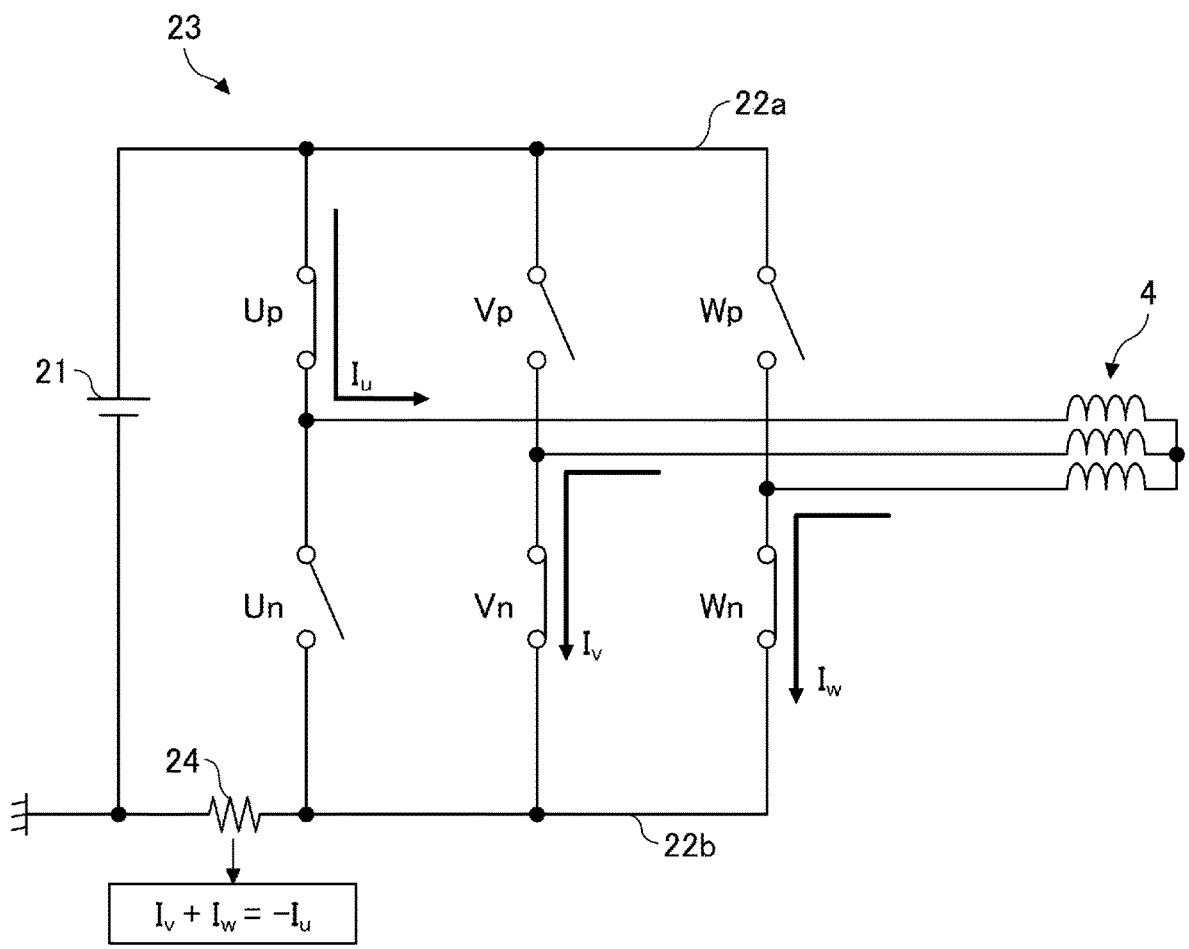
FIG. 14 is a diagram illustrating a switching state in which a negative U-phase current "−Iu" flows through the current detection unit.
Figure 15:
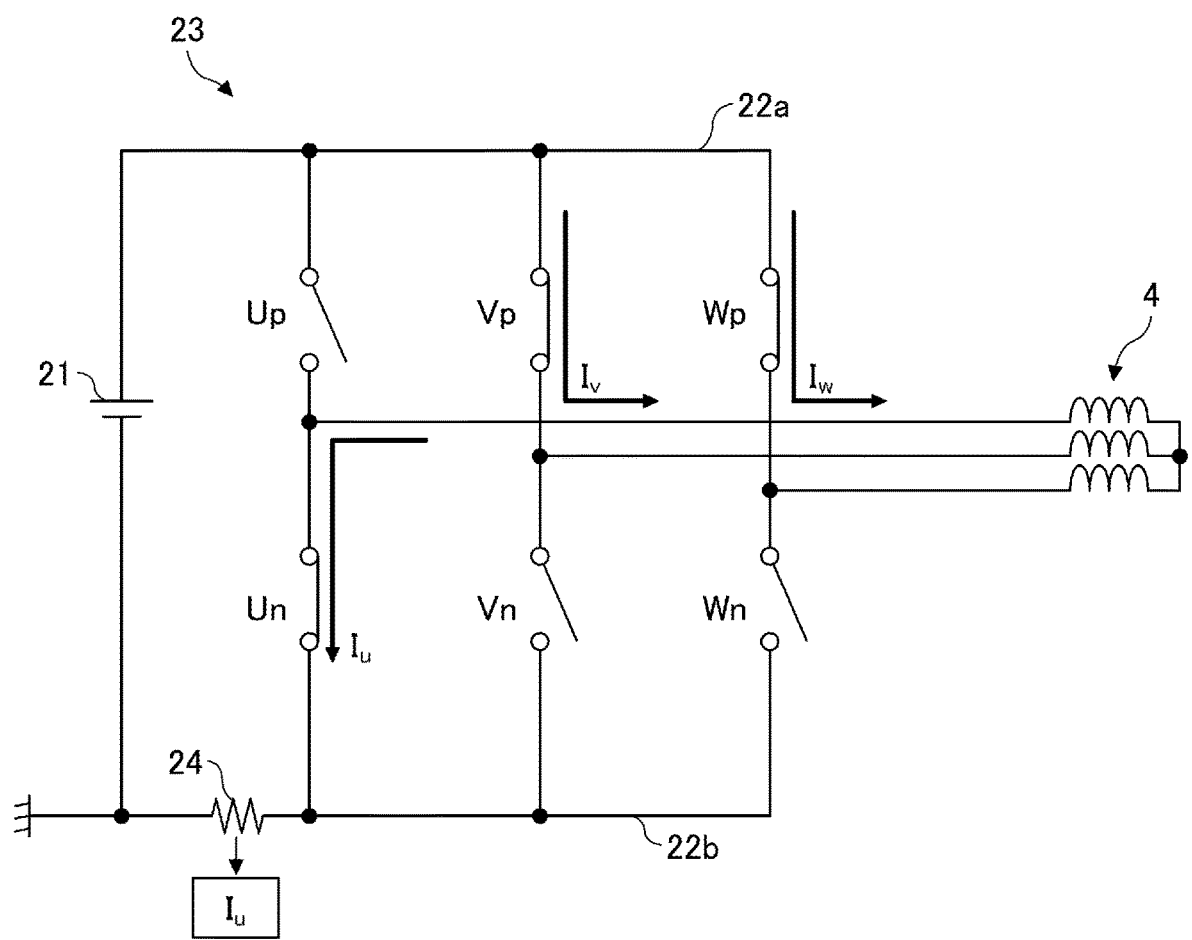
FIG. 15 is a diagram illustrating a switching state in which a positive U-phase current "+Iu" flows through the current detection unit.

During the first current detection period P1 (which is an example of the first period), because the upper arm Up and the lower arms Vn and Wn are turned into the on state with the first energization pattern, the negative U-phase current "−Iu" flowing in from the U-phase terminal of the motor 4 flows into the current detection unit 24 (see FIG. 14). During the second current detection period P2 (which is an example of the second period), because the lower arm Un and the upper arms Vp and Wp are turned into the on state with the second energization pattern, the positive U-phase current "+Iu" flowing out from the U-phase terminal of the motor 4 flows into the current detection unit 24 (see FIG. 15). The current detector 27 detects the magnitude of a first current for the first phase flowing through the current detection unit 24 during the first period, as well as the magnitude of a second current for the first phase flowing through the current detection unit 24 during the second period. In this example, the magnitude of the first current is a current magnitude of the negative U-phase current "−Iu(=Iv+Iw)", and the magnitude of the second current is a current magnitude of the positive U-phase current "+Iu."

In the second current detection method, the current detector 27 uses the fact that phase currents, for the first phase, detected during one period of the PWM signal become a pair, to thereby detect, as a portion affected by the electromotive force, a difference between a magnitude that is half of the sum of the first current magnitude for the first phase and the second current magnitude for the first phase, and zero. Then, the current detector 27 calculates an offset current magnitude for the first phase, by subtracting the detected portion affected by the electromotive force, from the first current magnitude or second current magnitude that is detected at a timing at which the first detection or second detection is performed. Even during the idle time of the rotor, the current detector 27 can also calculate an offset current magnitude for the second phase or the third phase, other than the first phase, as in the method described above.

Figure 16:
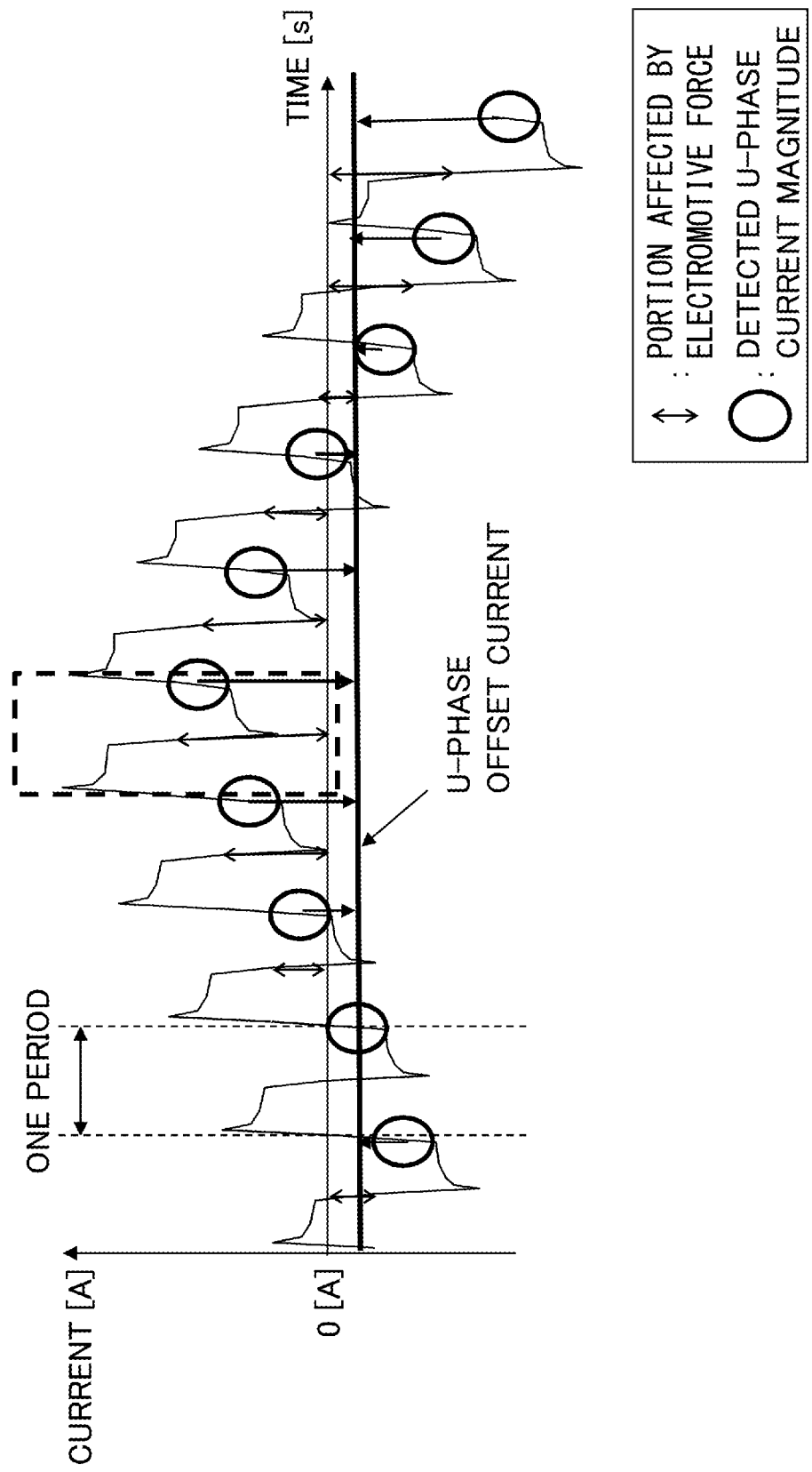
FIG. 16 is a diagram illustrating an example of the waveform used in a process, during the idle time of the rotor, of calculating a U-phase offset current magnitude that is obtained during 10 periods of the PWM signal.
Figure 17:
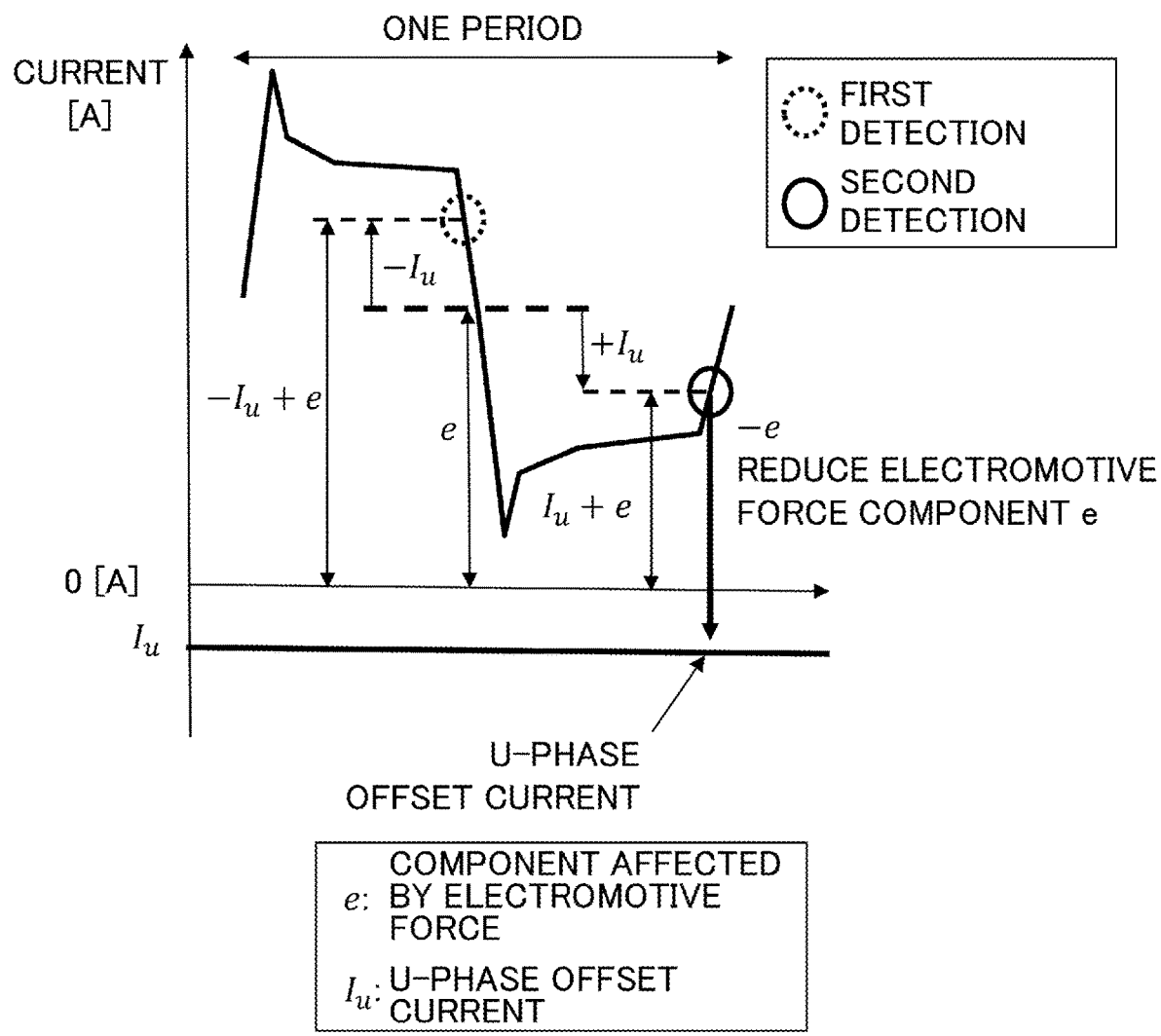
FIG. 17 is an enlarged view of a portion surrounded by a dotted line frame illustrated in FIG. 16.

FIG. 16 is a diagram illustrating an example of the waveform used in a process, during the idle time of the rotor, of calculating a U-phase offset current magnitude that is obtained during 10 periods (for example, 400 µs) of the PWM signal. FIG. 17 is an enlarged view of a portion surrounded by a dotted line frame illustrated in FIG. 16, and is a diagram illustrating an example of the waveform used in the process, during the idle time of the rotor, of calculating the U-phase offset current magnitude that is obtained during one period (for example, 40 µs) of the PWM signal. The U phase is an example of the first phase.

The current detector 27 can derive a component e affected by the electromotive force, by calculating half of the sum of the U-phase first current magnitude (−Iu+e), which flows through the current detection unit 24, obtained in the first detection that is performed within the first period, and the U-phase second current magnitude (Iu+e), which flows through the current detection unit 24, obtained in the second detection that is performed within the second period. In the example illustrated in FIGS. 16 and 17, the current detector 27 can calculate a U-phase offset current magnitude Iu, by subtracting the affected component e from the U-phase second current magnitude (Iu+e) detected in the second detection.

As described above, according to the second current detection method, a given U-phase offset current magnitude can be calculated within a time period that is defined by one period of the PWM signal. That is, even during the idle time of the rotor, the U-phase offset current magnitude can be calculated for a short time period, and thus idling of the rotor is unlikely to be inhibited. As a result, occurrence of an unintended behavior, such as deceleration or abnormal noise of the motor 4, can be suppressed.

Figure 18:
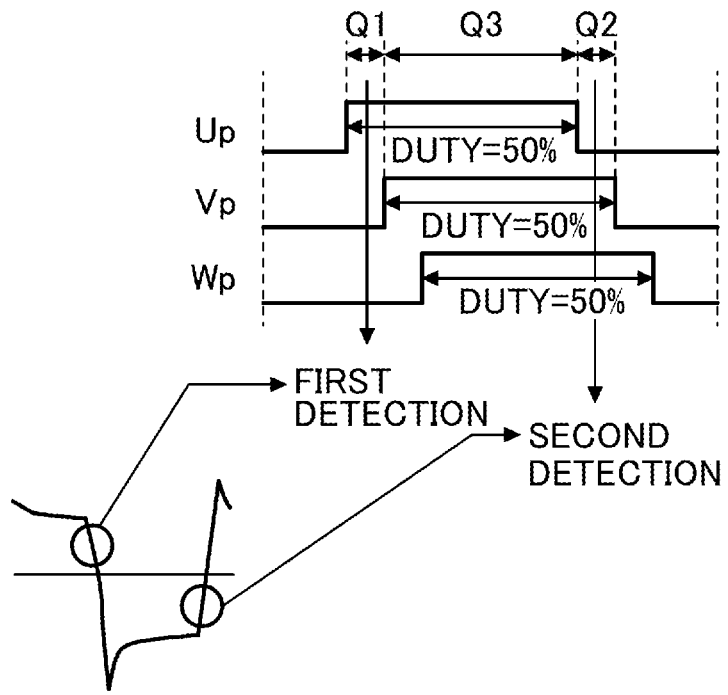
FIG. 18 is a diagram illustrating an example of the waveform used in the process of calculating the U-phase offset current magnitude.
Figure 19:
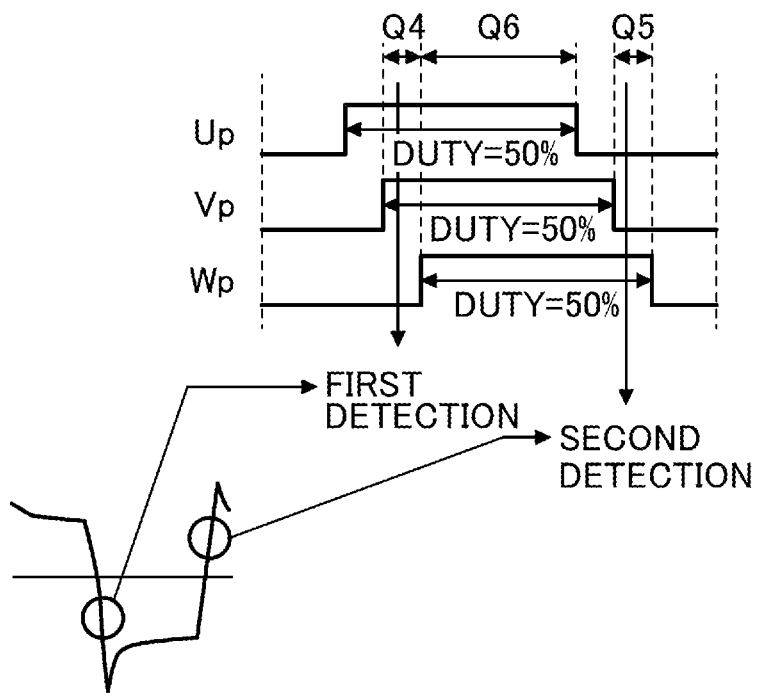
FIG. 19 is a diagram illustrating an example of the waveform used in a process of calculating a W-phase offset current magnitude.

FIG. 18 is a diagram illustrating an example of the waveform obtained in the process of calculating the magnitude of the U-phase offset current. FIG. 19 is a diagram illustrating an example of the waveform obtained in the process of calculating the magnitude of the W-phase offset current. As illustrated in FIG. 19, the magnitude of the W-phase offset current (or the magnitude of the V-phase offset current) can also be calculated as in the magnitude of the U-phase offset current.

FIG. 18 illustrates a case in which the PWM signal generator 32 generates the PWM signal, of each phase, having a first period length with a duty cycle of 50%. The PWM signal generator 32 generates the PWM signal, of each phase, having the first period length that is defined by a first period Q1 during which a portion of the arms is turned on with the first energization pattern, during the idle time of the rotor; a second period Q2 during which a portion of the arms is turned on with the second energization pattern, during the idle time of the rotor; and a third period Q3 during which all upper arms or all lower arms are turned on with the third energization pattern, during the idle time of the rotor. In the example illustrated in FIG. 18, the first period length is defined by the first period Q1 within which a timing of the first detection is indicated; the second period Q2 within which a timing of the second detection is indicated; and the third period Q3 during which all the upper arms are turned on. The current detector 27 subtracts, from the first current magnitude or the second current magnitude, a magnitude that is half of the sum of a given first current magnitude for the first phase, which flows through the current detection unit 24 during the first period Q1, and a given second current magnitude for the first phase, which flows through the current detection unit 24 during the second period Q2. In this example, the current detector 27 calculates a given offset current magnitude for the first phase, by decreasing from the second current magnitude. FIG. 18 illustrates a case where the first phase is the U phase.

FIG. 19 illustrates a case in which the PWM signal generator 32 generates the PWM signal, for each phase, having a second period length with a duty cycle of 50%. The PWM signal generator 32 generates the PWM signal, for each phase, having the second period length that is defined by a fourth period Q4 during which a portion of the arms is turned on with a fourth energization pattern, during the idle time of the rotor; a fifth period Q5 during which a portion of the arms is turned on with a fifth energization pattern, during the idle time of the rotor; and a sixth period Q6 during which all upper arms or all lower arms are turned on with a sixth energization pattern, during the idle time of the rotor. In the example illustrated in FIG. 19, the second period length is defined by the fourth period Q4 within which a timing of the first detection is indicated; the fifth period Q5 within which a timing of the second detection is indicated; and the sixth period Q6 during which all the upper arms are turned on. The current detector 27 subtracts, from a third current magnitude or a fourth current magnitude, a magnitude that is half of the sum of the third current magnitude for the second phase, which flows through the current detection unit 24 during the fourth period Q4, and the fourth current magnitude for the second phase, which flows through the current detection unit 24 during the fifth period Q5. In this example, the current detector 27 calculates a given offset current magnitude for the second phase, by decreasing from the fourth current magnitude. FIG. 19 illustrates a case where the second phase is the W phase. The second period length may be defined by a period adjacent to a period having the first period length; by a given period, where one or more period lengths are present between the given period and a period having the first period length; or by the same period as the period having the first period length.

For example, while the inverter 23 rotates the rotor, the current detector 27 may correct a given current magnitude of the phase current, for the first phase, flowing through the current detection unit 24, in accordance with the offset current magnitude for the first phase. Similarly, in accordance with the offset current magnitude for the second phase, the current detector 27 may correct a given current magnitude of the phase current, for the second phase, flowing through the current detection unit 24. For example, although the first phase is the U phase and the second phase is the W phase, any other combination may be used.

For example, the current detector 27 may use the fact that a total sum of phase currents for the three phases is 0, to thereby detect (calculate) an offset current magnitude for the third phase. The third phase is, for example, the V phase. While the inverter 23 rotates the rotor, the current detector 27 may correct a given phase current for the third phase flowing through the current detection unit 24, in accordance with the detected (calculated) offset current magnitude for the third phase.

For example, the current detector 27 calculates an offset current magnitude for the first phase, calculates an offset current magnitude for the second phase, calculates an offset current magnitude for the remaining third phase, from calculated results, and then stores, in the memory, calculated offset current magnitudes for the three phases. After the offset current magnitudes for the three phases are stored in the memory, the motor 4 starts with the inverter 23, and then the inverter 23 rotates the rotor.

While the inverter 23 rotates the rotor, the current detector 27 detects the current magnitude of each of the phase currents for the three phases, by performing current detection at least two times. The current detector 27 calculates the detected current magnitude for each of the phase currents Iu, Iv, and Iw for the three phases, by subtracting, for each one period of the PWM signal, the offset current magnitude for a corresponding phase among the three phases, which is stored in advance in the memory, from the current magnitude of the phase current, for the corresponding phase, that is detected for each one period of the PWM signal. With this arrangement, while the inverter 23 rotates the rotor, the current detector 27 corrects the phase current for each phase flowing through the current detection unit 24, in accordance with a corresponding offset current magnitude for each phase. Thus, detection error is removed from the detected current magnitude of each of the phase currents Iu, Iv, and Iw for the three phases. While the inverter 23 rotates the rotor, the PWM signal generator 32 generates the three phase PWM signal, by using the detected current magnitude, from which detection error is removed, for each of the corrected phase currents Iu, Iv, and Iw for the three phases. Thus, rotation of the motor 4 can be controlled by the inverter 23, with high accuracy.

Functions of the current detector 27, the energization pattern generator 35, the current detection-timing adjusting unit 34, and the initial-position estimating unit 38 are implemented by a central processing unit (CPU) that operates with a program that is readably stored in a storage device not illustrated. For example, the above functions are implemented by cooperation of hardware and software in a microcomputer including the CPU.

Although the motor controller, the motor system, and the method for controlling a motor have been described using the embodiments, the present invention is not limited to the above embodiments. Various modifications and improvements, such as combinations or replacements of a portion or entirety of any other embodiments, can be made within a scope of the present invention.

For example, the current detector, which outputs a detected signal corresponding to the magnitude of the current flowing into the DC side of the inverter, may be a detector that outputs a detected signal corresponding to the magnitude of the current flowing into the positive-side bus. The current detector may be a sensor such as a current transformer (CT).

This international application claims priority to Japanese Patent Application No. 2020-064148, filed Mar. 31, 2020, the contents of which are incorporated herein by reference in their entirety.

REFERENCE SIGNS LIST 1-1 motor system
4 motor
21 DC power source
22a positive-side bus
22b negative-side bus
23 inverter
24 current detection unit
27 current detector
30 vector control unit
32 PWM signal generator
33 drive circuit
34 current detection-timing adjustment unit
35 energization pattern generator
36 clock generator
37 carrier generator
38 initial-position estimating unit
100-1 motor controller
Up, Vp, Wp, Un, Vn, Wn arm

The invention claimed is:

1. A motor controller comprising:
an inverter configured to turn on a different portion of all arms, for each energization pattern, among the arms, to energize a motor that includes a rotor;
a current detection unit coupled to a DC side of the inverter;
a PWM signal generator configured to generate a PWM signal, for each phase, with a duty cycle of a same value, the PWM signal having a first period length that is defined by
a first period during which a portion of the arms is turned on with a first energization pattern, during an idle time of the rotor,
a second period during which a portion of the arms is turned on with a second energization pattern, during the idle time, and
a third period during which all upper arms or all lower arms, among the arms, are turned on with a third energization pattern, during the idle time; and
a current detector configured to
subtract, from a first current magnitude or a second current magnitude, a magnitude that is half of a sum of the first current magnitude for a first phase flowing through the current detection unit during the first period, and the second current magnitude for the first phase flowing through the current detection unit during the second period, and
calculate an offset current magnitude for the first phase during the idle time.

2. The motor controller according to claim 1, wherein the current detector is configured to correct, while the inverter rotates the rotor, a current magnitude of a phase current, for the first phase, flowing through the current detection unit, in accordance with the offset current magnitude for the first phase during the idle time.

3. The motor controller according to claim 2, wherein the PWM signal generator is configured to
use the corrected current magnitude of the phase current for the first phase, and
generate the PWM signal, for the first phase, used while the inverter rotates the rotor.

4. The motor controller according to claim 1,
wherein the PWM signal generator is configured to generate a PWM signal for each phase, with a duty cycle of a same value, the PWM signal having a second period length that is defined by
- a fourth period during which a portion of the arms is turned on with a fourth energization pattern, during the idle time,
- a fifth period during which a portion of the arms is turned on with a fifth energization pattern, during the idle time, and
- a sixth period during which all the upper arms or all the lower arms, among all the arms, are turned on with a sixth energization pattern, during the idle time, and wherein the current detector is configured to
- subtract, from a third current magnitude or a fourth current magnitude, a magnitude that is half of a sum of the third current magnitude for a second phase flowing through the current detection unit during the fourth period, and the fourth current magnitude for the second phase flowing through the current detection unit during the fifth period, and
- calculate an offset current magnitude for the second phase during the idle time.

5. The motor controller according to claim 4, wherein the current detector is configured to correct, while the inverter rotates the rotor, a current magnitude of a phase current for the second phase flowing through the current detection unit, in accordance with the offset current magnitude for the second phase during the idle time.

6. The motor controller according to claim 5, wherein the PWM signal generator is configured to use the corrected current magnitude of the phase current for the second phase, to generate the PWM signal, for the second phase, used while the inverter rotates the rotor.

7. The motor controller according to claim 4, wherein the current detector is configured to
- calculate an offset current magnitude for a third phase during the idle time, based on the offset current magnitude for the first phase during the idle time and the offset current magnitude for the second phase during the idle time, and
- correct, while the inverter rotates the rotor, a current magnitude of the phase current for the third phase flowing through the current detection unit, in accordance with the offset current magnitude for the third phase during the idle time.

8. The motor controller according to claim 7, wherein the PWM signal generator is configured to use the corrected current magnitude of the phase current for the third phase, to generate the PWM signal, for the third phase, used while the inverter rotates the rotor.

9. The motor controller according to claim 1, wherein the same value corresponds to 50%.

10. A motor system comprising:
the motor controller according to claim 1; and
the motor.

11. A method for controlling a motor, performed by a motor controller that turns on a different portion of all arms, for each energization pattern, among the arms of an inverter, to energize the motor that includes a rotor, the method comprising:
generating a PWM signal, for each phase, with a duty cycle of a same value, the PWM signal having a first period length that is defined by
- a first period during which a portion of the arms is turned on with a first energization pattern, during an idle time of the rotor,
- a second period during which a portion of the arms is turned on with a second energization pattern, during the idle time, and
- a third period during which all upper arms or all lower arms, among the arms, are turned on with a third energization pattern, during the idle time; and subtracting, from a first current magnitude or a second current magnitude, a magnitude that is half of a sum of the first current magnitude for a first phase flowing through a current detection unit, which is coupled to a DC side of the inverter, during the first period, and the second current magnitude for the first phase flowing through the current detection unit during the second period, thereby calculating an offset current magnitude for the first phase during the idle time.

* * * * *